(12) United States Patent
Boilen et al.

(10) Patent No.: US 6,374,551 B1
(45) Date of Patent: Apr. 23, 2002

(54) MOVEABLE STRUCTURAL REINFORCEMENT SYSTEM

(75) Inventors: Kenneth T. Boilen, Greenbrae; Arthur B. Richardson, Mill Valley; John Hulls, Point Reyes; Jean-Jacques Landry, San Francisco; Ralph C. Francis, Oakland, all of CA (US)

(73) Assignee: Ei-Land Corporation, San Francisco, CA (US)

( * ) Notice: Subject to any disclaimer, the term of this patent is extended or adjusted under 35 U.S.C. 154(b) by 0 days.

(21) Appl. No.: 09/497,414

(22) Filed: Feb. 3, 2000

Related U.S. Application Data

(63) Continuation-in-part of application No. 09/257,875, filed on Feb. 25, 1999, now Pat. No. 6,192,637.

(51) Int. Cl.⁷ .................................................. E04B 1/98
(52) U.S. Cl. .................... 52/167.3; 52/148; 52/149; 52/223.7; 52/657; 52/291; 52/656.4; 52/656.7; 52/693; 160/201; 160/229.1; 160/236; 160/133; 49/199; 49/453
(58) Field of Search ............................ 52/167.1, 167.3, 52/149, 174, 176, 146, 148, 693, 657, 573.1, 656.2, 656.7, 656.4, 801.12, 223.6, 223.7, 291; 160/201, 229.1, 236, 130–133; 49/26, 28, 197–200, 453

(56) References Cited

U.S. PATENT DOCUMENTS

| | | | |
|---|---|---|---|
| 1,262,301 A | | 4/1918 | Blest |
| 1,286,664 A | | 12/1918 | Larson |
| 2,124,969 A | | 7/1938 | Bagely et al. |
| 3,443,625 A | | 5/1969 | Moser et al. |
| 4,545,466 A | | 10/1985 | Izeki et al. |
| 4,810,920 A | | 3/1989 | Yamamoto |
| 5,022,454 A | * | 6/1991 | Kobayashi et al. ......... 160/202 |
| 5,331,786 A | | 7/1994 | Lippert |
| 5,375,382 A | | 12/1994 | Weidlinger |
| 5,445,207 A | | 8/1995 | Romanelli et al. |
| 5,522,446 A | * | 6/1996 | Mullet et al. ............ 160/229.1 |
| 5,584,332 A | | 12/1996 | Miller |
| 5,584,333 A | * | 12/1996 | Torchetti et al. ............ 160/201 |
| 5,626,176 A | * | 5/1997 | Lewis, Jr. et al. .......... 160/201 |
| 5,697,725 A | | 12/1997 | Ballash et al. |
| 5,727,614 A | * | 3/1998 | Lichy ........................ 160/201 |
| 5,765,622 A | * | 6/1998 | Lichy ...................... 160/273.1 |
| 5,819,834 A | | 10/1998 | Wedekind |
| 5,887,385 A | * | 3/1999 | Horner et al. ................. 49/26 |
| 5,927,019 A | | 7/1999 | Ichida |
| 6,041,844 A | * | 3/2000 | Kellogg et al. ............. 160/201 |
| 6,082,429 A | * | 7/2000 | Ochoa ........................ 160/201 |
| 6,112,799 A | * | 9/2000 | Mullet et al. ............... 160/201 |

\* cited by examiner

Primary Examiner—Carl D. Friedman
Assistant Examiner—Yvonne M. Horton
(74) Attorney, Agent, or Firm—Burns, Doane, Swecker & Mathis, L.L.P.

(57) ABSTRACT

A moveable structural reinforcement system is described including a moveable panel adapted to substantially close a building opening, the panel including variable shear load resistance means for regulating the shear stiffness of the building when the panel is in a closed position.

12 Claims, 35 Drawing Sheets

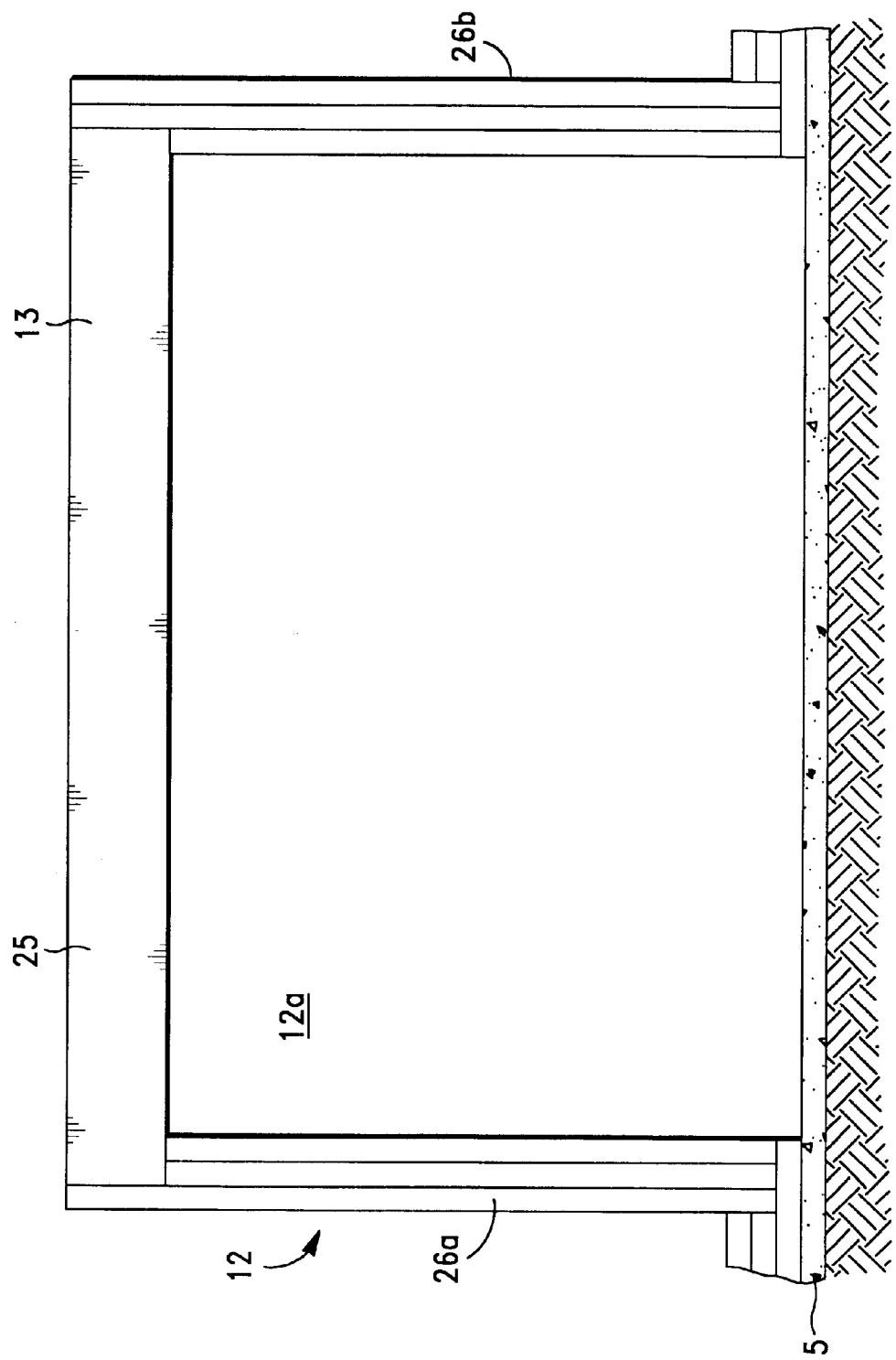

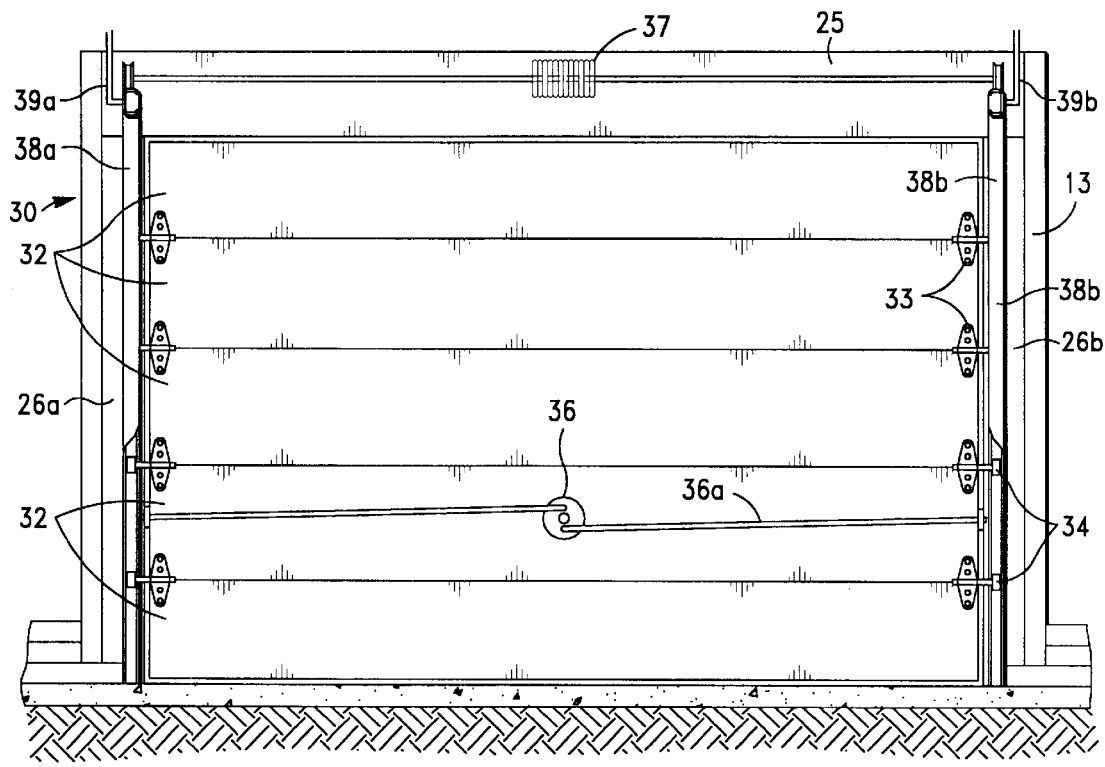
FIG.—6A
(PRIOR ART)
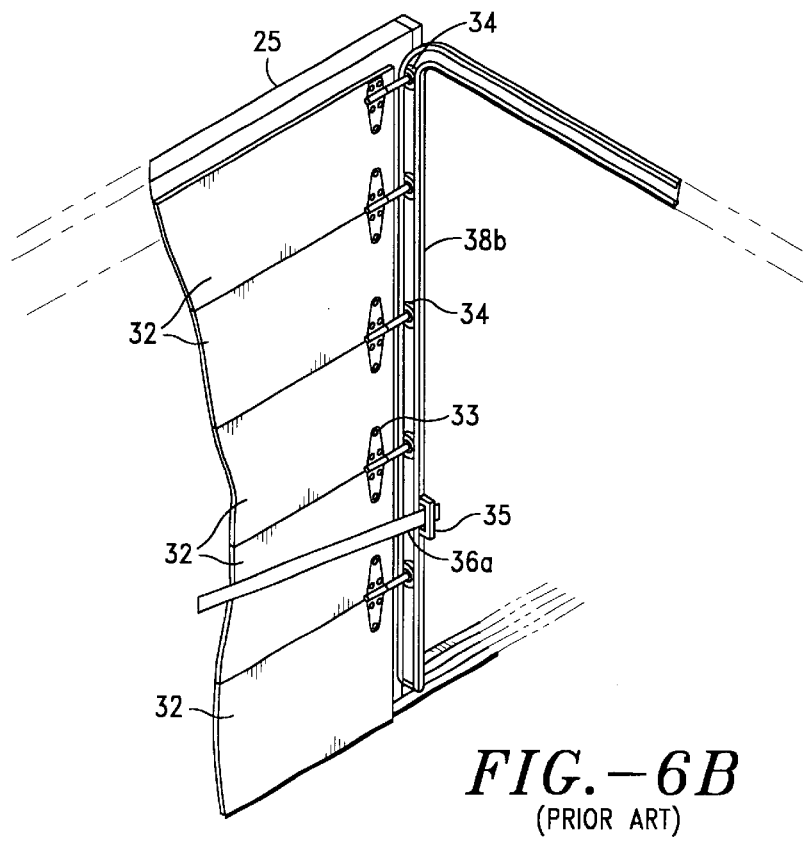
FIG.—6B
(PRIOR ART)

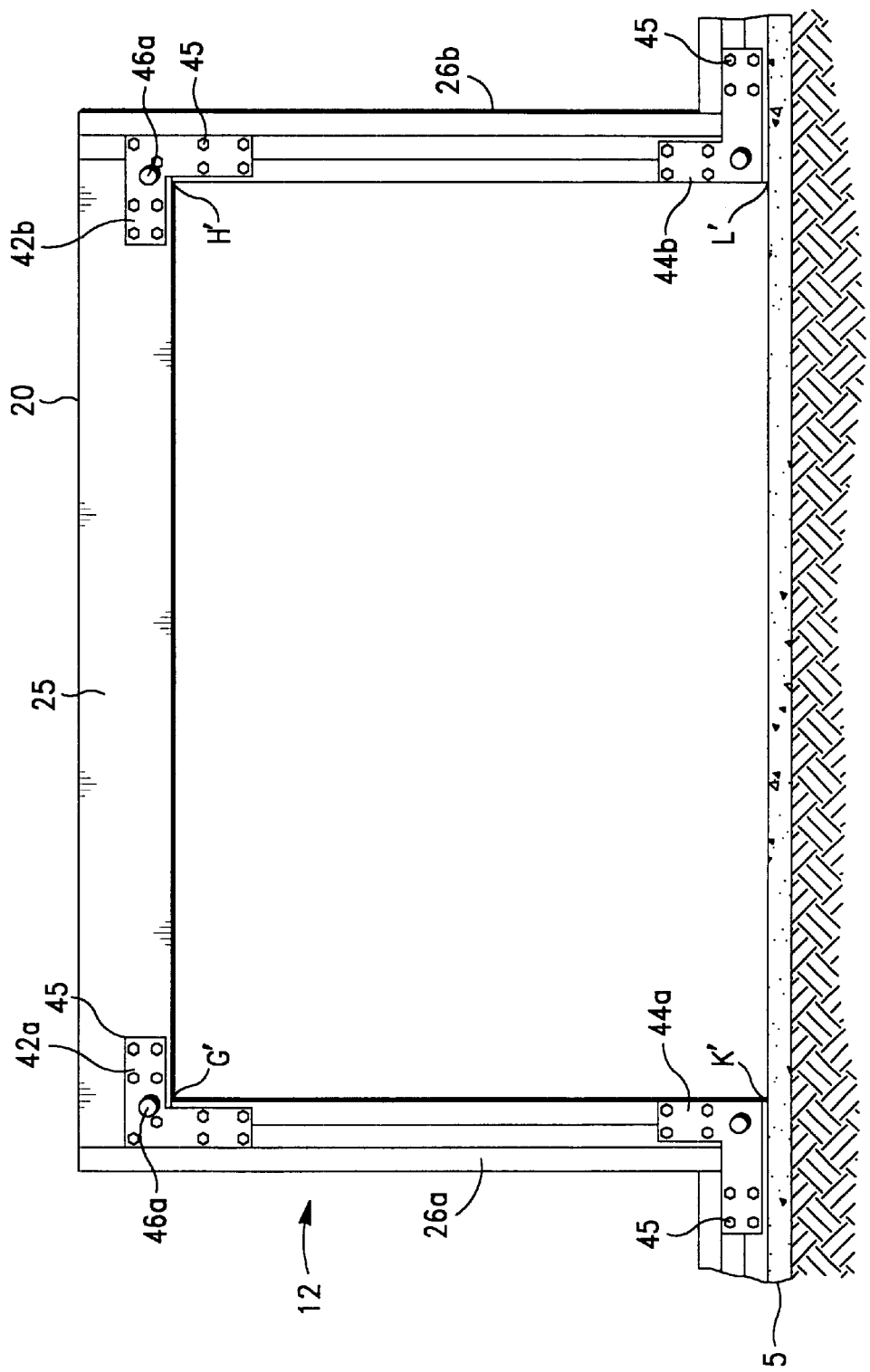

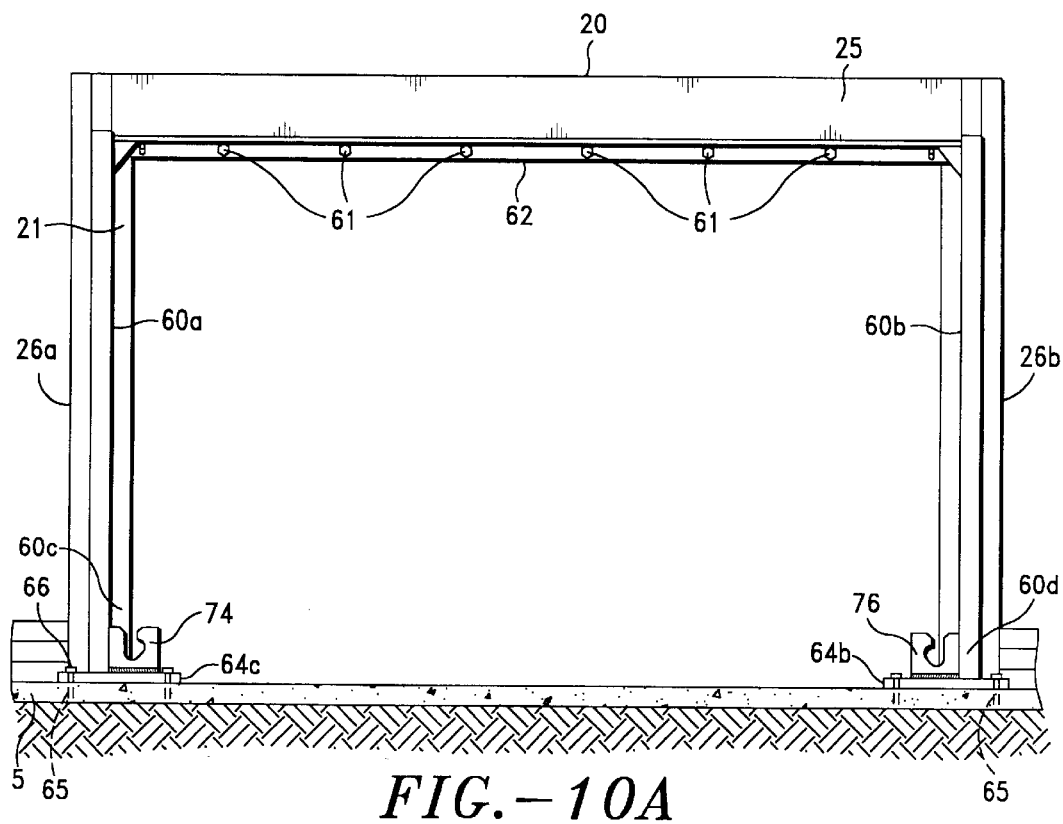
FIG.—10A
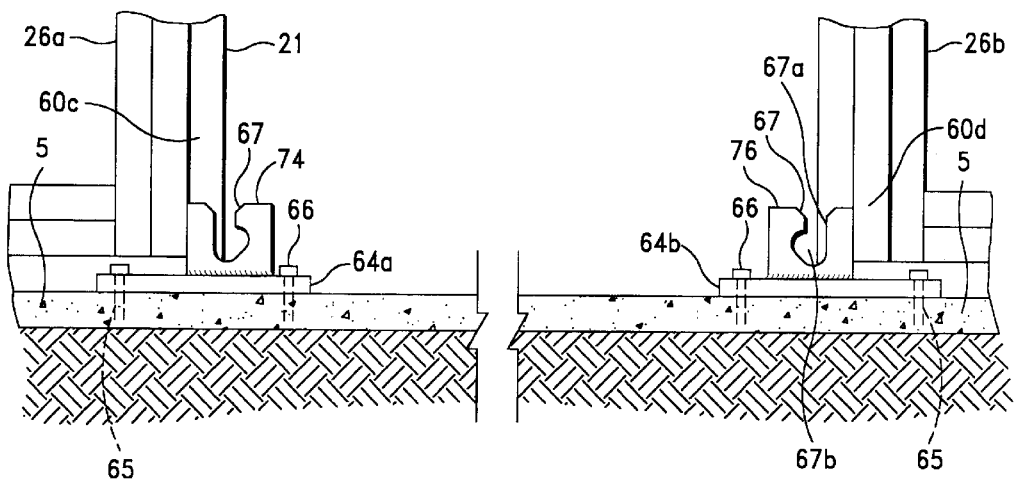
FIG.—10B

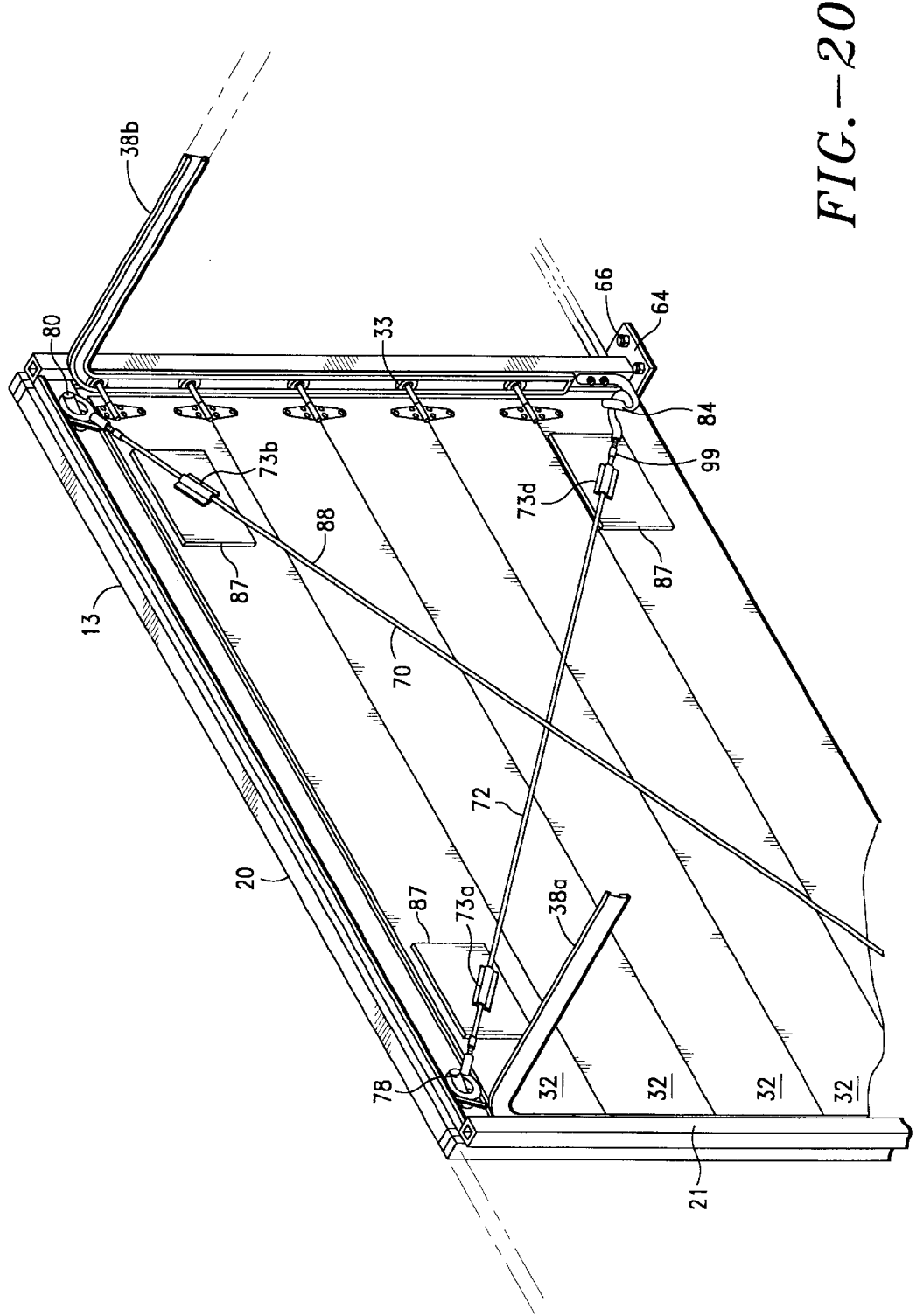
FIG.—20

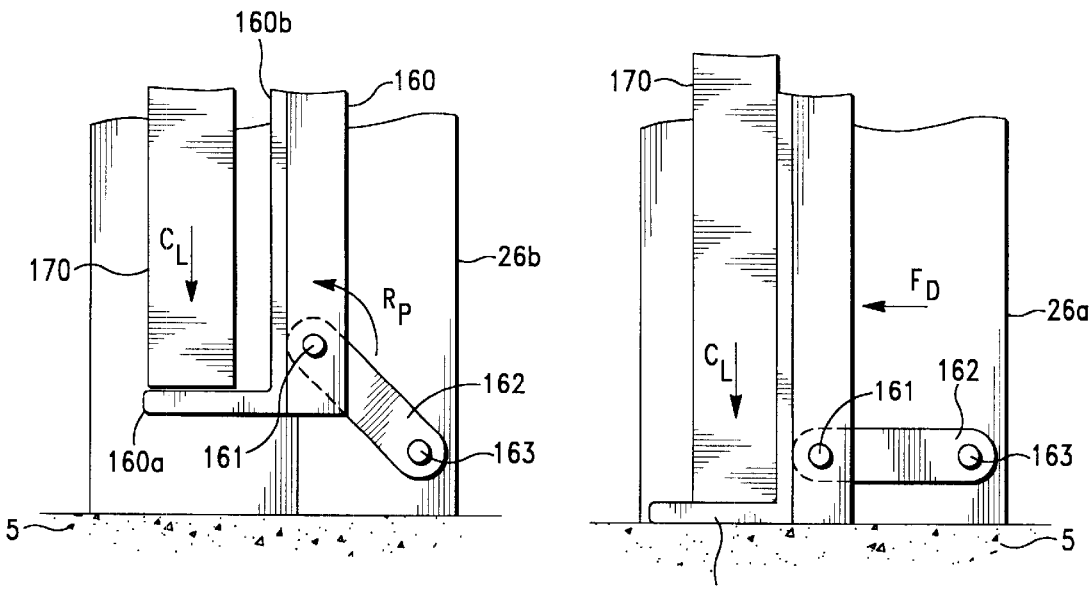
FIG.-38
FIG.-39
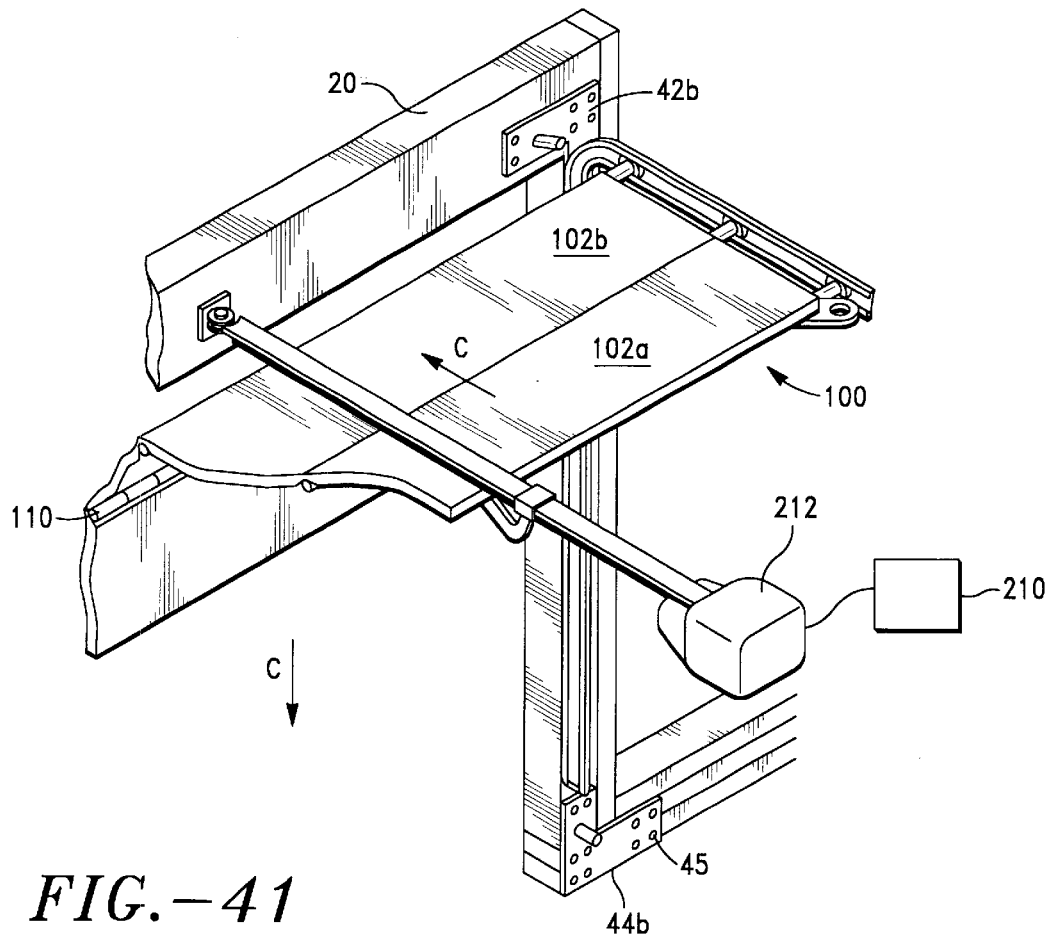
FIG.-41

MOVEABLE STRUCTURAL REINFORCEMENT SYSTEM

This Application is a Continuation-In-Part of prior application Ser. No. 09/257,875 filed, Feb. 25, 1999, now U.S. Pat. No. 6,192,637.

FIELD OF THE PRESENT INVENTION

The present invention relates generally to structural support systems. More particularly, the invention relates to a moveable structural reinforcement system for a building.

BACKGROUND OF THE INVENTION

It is well known that earthquakes impose cyclic lateral forces on buildings and structures causing them to vibrate and, in severe instances, to deform and ultimately collapse. Presently, there exist a variety of structural systems for resisting the earthquake—induced forces in the buildings. Such systems include moment-resisting frames, braced frames and fixed shear walls. Illustrative are the systems disclosed in U.S. Pat. Nos. 4,810,920 and 4,545,466.

A major drawback of the noted systems is that each is permanently affixed or adapted to a non-moveable portion of the building structure (i.e., frame). The systems are thus not designed or readily adaptable to enhance earthquake response performance (i.e., earthquake resistance) of the building while facilitating entry and egress from the building.

It is also well known that vehicle trailers (and shipping containers) experience significant bending and torsional forces during transport. Numerous systems and designs, such as monocoque panels and frames, are thus employed to enhance the structural integrity of such trailers.

The noted vehicle systems are however premised on or readily adaptable to box-like panel structures—i.e., an opening disposed at one end thereof. The systems are thus relatively ineffective to address the effects of any significant discontinuity in a panel structure (e.g., side opening), which in all likelihood, would adversely effect the torsional rigidity of the trailer structure.

It is therefore an object of the present invention to provide a moveable structural reinforcement system which enhances the structural integrity of the applied structure in addition to providing an effective closure or barrier.

It is another object of the present invention to provide a moveable structural reinforcement system for a building which is readily adaptable to the existing building structure.

It is yet another object of the present invention to provide a moveable structural reinforcement system which enhances the earthquake response performance of a building.

It is yet another object of the present invention to provide a moveable structural reinforcement system which enhances external wind load resistance of a building.

It is yet another object of the present invention to provide a lightweight moveable structural reinforcement system for a vehicle trailer and/or cargo container which facilitates side loading and unloading from multiple locations without significantly adversely effecting the structural integrity of the trailer and/or container.

SUMMARY OF THE INVENTION

In accordance with the above objects and those that will be mentioned and will become apparent below, the structural reinforcement system in accordance with this invention comprises a moveable panel adapted to substantially close a building opening, the panel including variable shear load resistance means for regulating the shear stiffness of the building when the panel is in the closed position. In a preferred embodiment, the shear load resistance means provides supplemental shear stiffness in the range of approximately 2 to 35% of the inherent shear load resistance of the building.

In an additional embodiment of the invention, the structural reinforcement system comprises a movable panel adapted to substantially close a building opening, the panel including variable damping means for regulating the damping of the building when the panel is in the closed position.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 5 is a front elevational view of a conventional garage opening frame structure;

FIG. 6A is a front elevational view of a prior art garage door system;

FIG. 6B is a partial perspective view of the garage door system shown in FIG. 6A;

FIG. 7A is a front elevational view of the frame structure shown in FIG. 5, illustrating the placement of the frame reinforcement members and shear members according to the invention;

FIG. 10A is a front elevational view of a reinforcing frame structure according to the invention;

FIG. 10B is a partial plan view of the reinforcing frame structure shown in FIG. 10A, illustrating the load collectors according to the invention;

FIG. 20 is a partial perspective view of the embodiment of the invention shown in FIG. 15, illustrating an additional embodiment of a load collector according to the invention;

FIGS. 38 and 39 are partial elevational views of one embodiment of the panel securing means according to the invention;

FIG. 41 is a partial perspective view of the embodiment of the invention shown in FIG. 8A, illustrating the automatic panel closing means according to the invention.

DETAILED DESCRIPTION OF THE PREFERRED EMBODIMENT

Figure 1:
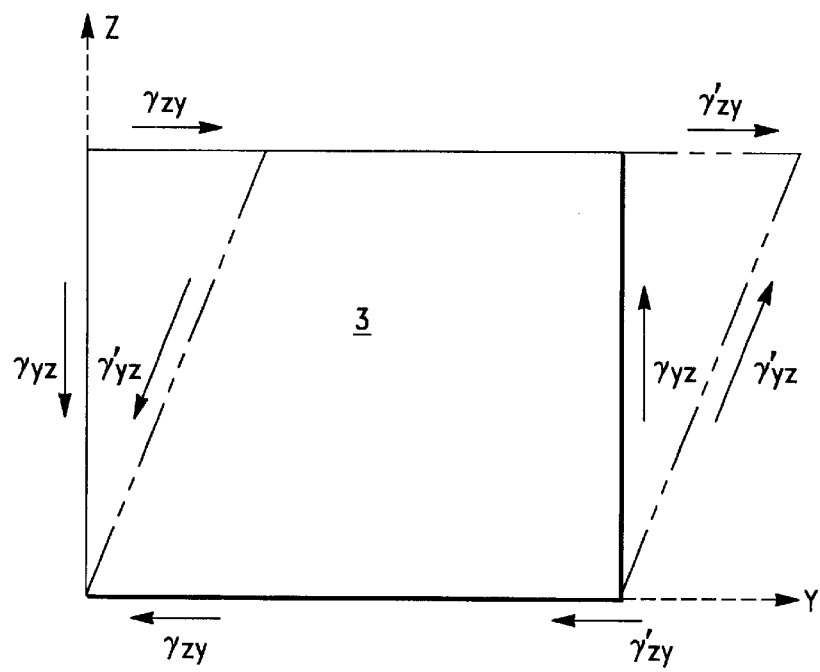
FIG. 1 is a schematic illustration of a panel subjected to shear loading.

The disclosed structural reinforcement system substantially reduces or eliminates the disadvantages and shortcomings associated with prior art closure systems. According to the invention, the reinforcement system enhances the structural integrity of the applied structure in addition to providing an effective moveable closure or barrier. As a result, the system can be employed in a variety of applications, such as buildings (i.e., garage openings) to enhance earthquake and wind resistance, cargo carriers or trailers to facilitate side loading and motor vehicles to enhance crashworthiness. Each of the noted applications is discussed in detail below.

It is well known that earthquakes generate ground motions that induce lateral forces on buildings, causing the buildings to respond dynamically (to vibrate). Dynamic response can cause damage in a building because of the potential effect of the dynamic application of the induced forces have in amplifying the amplitude of the force.

The dynamic response of the building depends primarily on the following four parameters: (1) the characteristics of the ground motion (acceleration) at the building site, (2) the mass of the building, (3) the stiffness of the building, and (4) the damping in the building. By the term "building", as used herein, it is meant to mean a permanent roofed and walled structure, including, but not limited to, a dwelling, commercial structure, industrial facility, storage facility and other like structures.

There are a variety of engineering characterizations available for the determination of the lateral force and, thereby, the response of a building subjected to the ground motions of an earthquake. For most typical single family dwellings classified as *Bearing Wall Systems*, the minimum design lateral force can be determined from the *Simplified Static Force Procedure* or the *Static Force Procedure*, which are incorporated by reference. In these procedures, the design lateral force is determined from a set of formulae and Tables found in the such documents as the Uniform Building Code (UBC), or the Structural Engineers Association of California (SEAOC) Recommended Lateral Force Requirements and Commentary, 7$^{th}$ed., 1999, which are similarly incorporated by reference herein.

For earthquake resistant design optimization purposes, using the UBC/SEAOC *Static Force Procedure*, the total design base shear, V, can be determined from the following:

$$V = \frac{C_V}{(R/I)T}W \quad (1)$$

where:

| | | |
|---|---|---|
| V | = | Total design lateral force or base shear |
| $C_v$ | = | Seismic Coefficient (tabular value based on seismic zone and soil profile type) |
| W | = | Total seismic dead load (generally structure weight) |
| R | = | $R_0R_d$ = Reduction factor to include the effects of ductility and overstrength |
| $R_0$ | = | Numerical coefficient representing inherent overstrength of the lateral force-resisting system. This is a tabular value based on the basic structural system (e.g., bearing wall system) and the lateral force resisting system (e.g., light-framed walls with shear panels). |
| $R_d$ | = | Numerical coefficient representing the global ductility capacity of the lateral force resisting system. This is a tabular value based on basic structural system (e.g., bearing wall system) and the lateral force resisting system (e.g., light-framed walls with shear panels). |
| I | = | Importance factor. This is a tabular value based occupancy or function of the structure. I = 1 for typical single family dwellings. |
| T | = | Elastic fundamental period of vibration (in seconds) of the structure (can be approximated using UBC/SEAOC formulae, or determined from analysis). |

The value of the design base shear determined by Eq. (1) has building code specified upper and lower limits imposed to ensure that an appropriate value of base shear is defined.

It should be noted the coefficient R is a measure of the system to absorb energy and sustain cyclic inelastic deformations without collapse. More specifically $R_o$ reflects the lower bound of the strength of the lateral force system. One additional parameter $\Omega_o$ the seismic force amplification factor, reflects the upper bound strength of the lateral force system. These two parameters have the simple relation:

$$\Omega_o = 1.1 \ R_o \quad (2)$$

In addition, $R_o$ can be applied to establish a safe design base shear. In comparison, $\Omega_o$ is used to provide an estimate of the maximum forces developed in non-yielding elements of the lateral force system when the design basis ground motion is applied.

As will be appreciated by one having ordinary skill in the art, a major factor having considerable impact on the design base shear, V, is the behavioral characteristics of the respective building panels subjected to shear loading. This is initially evident from the variations in coefficients for the different structural systems outlined in the UBC/SEAOC Standards.

Referring to FIG. 1, there is shown a simple illustration of a building panel, 3, subject to shear stresses that distort the initially square/rectangular shape into a parallelogram. When considered to act over a discrete length along an edge of the panel, the shear stresses (γ) can be converted into a force resultant per unit length and then to a total resultant shear force along the panel edge. It is this resultant shear force characteristic of the panel that must be correctly proportioned in design.

In the seismic design (or retrofitting) of a building, it can be seen that a balance must be struck between providing the optimal shear characteristics of the respective building planes to provide the requisite shear panel to prevent serious damage or collapse of the building. The proper building rigidity must be provided while maintaining the desired level of ductility for energy dissipation. Unfortunately, practical design of typical dwelling structures include structural discontinuities (e.g.,windows, door) that can undermine the load path within a structure. An obvious source of major structural discontinuity is a garage opening.

As will be appreciated by one having ordinary skill in the art, the movable structural reinforcement system of the present invention, provides a novel means of enhancing the structural integrity (i.e., rigidity and ductility) of single and multi-level buildings. The reinforcement system also enhances the wind load resistance of the noted buildings.

As discussed in detail below, the reinforcement system ties the building together and helps to redistribute the applied force(s) to allow load sharing by and between the elements of the system. In addition, the reinforcement system can be seen to change the local character of the force resisting system from, example, a *Bearing Wall System to a Moment Resisting Frame System*. This type of change can enhance the strength and ductility of the local portion of the structure, ultimately improving the overall structural response.

Further, as discussed in detail below, by virtue of the unique mechanical design and synergism of the structural reinforcement system, the resultant shear load resistance and damping and ductility can be varied to achieve the desired seismic characteristics of the building.

Figure 2:
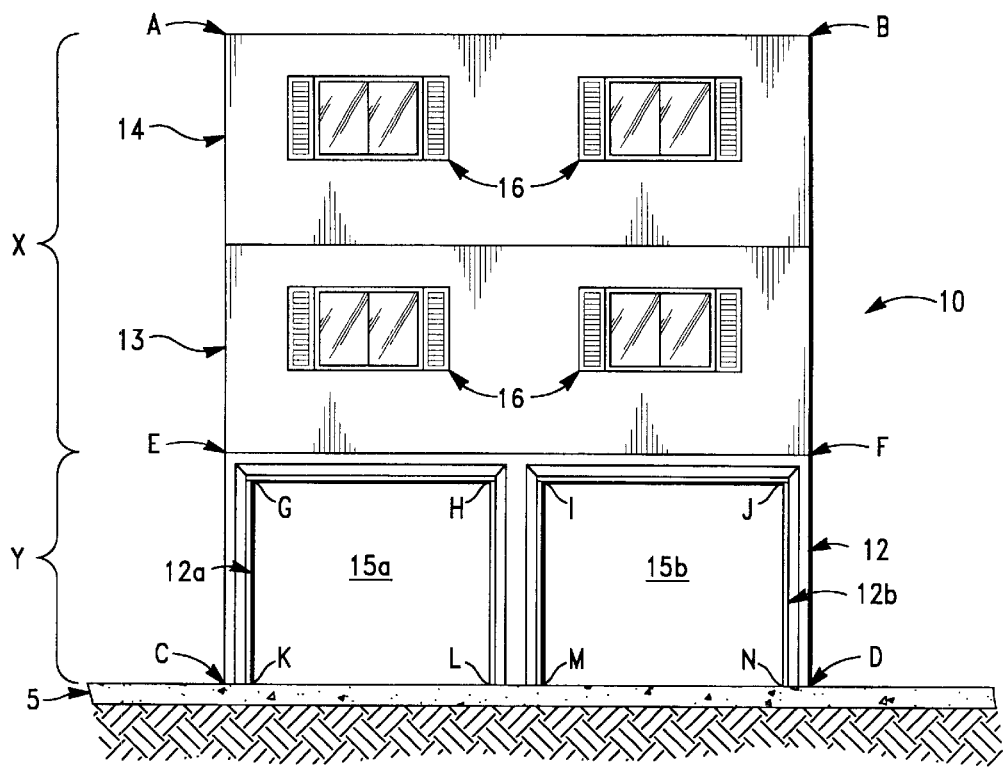
FIG. 2 is a schematic plan view of a three-story building.

Referring now to FIG. 2, there is shown a schematic illustration of a three-story building 10 supported by a foundation 5. By the term "foundation", as used herein, it is meant to mean the body of material upon which a building stands, including, but not limited to, concrete, soil, gravel and mixtures thereof, grade beams and pile systems.

The building 10 includes two floors or living areas 13, 14, a plurality of windows 16, and a garage section 12. The garage section 12 includes two openings 12a, 12b to facilitate vehicle entry and egress.

Referring to FIG. 5, the opening 12a, which is similar to opening 12b of a conventional garage, includes a header 25 and a pair of substantially vertical support members 26a, 26b. The vertical support members 26a, 26b are typically attached to the header 25 at one end, with the opposing end being in communication with the foundation 5. The support members 26a, 26b and header 25 are typically constructed out of wood (e.g., plurality of wood beams).

As illustrated in FIG. 5, the opening 12a of a conventional garage is typically disposed proximate the foundation 5. Thus, the present invention, discussed in detail below, is described in connection with a conventional garage opening 12a. However, as will be appreciated by one having ordinary skill in the art, the present invention is similarly applicable to raised building openings.

As illustrated in FIG. 2, the conventional garage section 12 also includes moveable doors 15a, 15b, which are designed to provide an effective closure for the garage openings 12a, 12b. The moveable doors 15a, 15b generally comprise a solid panel or a multiple panel (i.e., "roll-up") system.

Referring to FIG. 6A, there is shown a conventional "roll-up" garage door system 30. The system 30 includes a plurality of interconnected panels 32, a plurality of panel hinges 33 adapted to hingedly connect mating pairs of panels 32, a plurality of guide wheels 34, a locking system 36, a locking system arm 36a, arm engagement members 35, a tensioning spring mechanism 37, and a pair of guide rails 38a, 38b. According to conventional construction practice, each guide rail 38a, 38b is secured via bolts to a respective support post (26a, 26b) and the ceiling structure (not shown) via support brackets 39a, 39b.

As illustrated in FIGS. 6A and 6B, the guide wheels 34 are disposed on each end of the panels 32 and are adapted to rotatably engage the guide rails 38a, 38b. During raising and lowering of the interconnected panels 32, the guide wheels 34 are positioned by the rails 39a, 38b to facilitate a smooth transition of the panels 32.

The noted system 30, when closed, provides an effective closure of a garage opening. However, as will be appreciated by one skilled in the art, the conventional garage door system 30, described above, is not a structural member and thus provides little, if any, supplemental damping or stiffness (or shear and wind load resistance) to the building 10. Accordingly, the relative damping and stiffness of a building, such as building 10 illustrated in FIG. 2, will be dramatically different for the portion of the building defined by points A, B, E and F, denoted X, compared to the garage portion of the building defined by points E, F, C and D (with or without the garage doors 15a, 15b in closed positions), denoted Y.

Indeed, for purposes of comparison, assuming building portion Y is a separate structure, the associated response modification factor, R, can be taken as approximately 5.6. The seismic force amplification factor, $\Omega_o$, is by similar means equal to approx. 2.2.

In contrast, building portion X would have a response modification factor, R, of approx. 6.5. Structure X would also have a seismic force amplification factor, $\Omega_o$, of approx. 2.8.

It can thus be seen that R for section X ($R_x$) is approx. 14% greater than R for structure Y ($R_y$). Similarly, $\Omega_o$ for structure X ($\Omega_o'$) is approx. 21% greater than $\Omega_o$ for structure Y ($\Omega_o''$).

Figure 4:
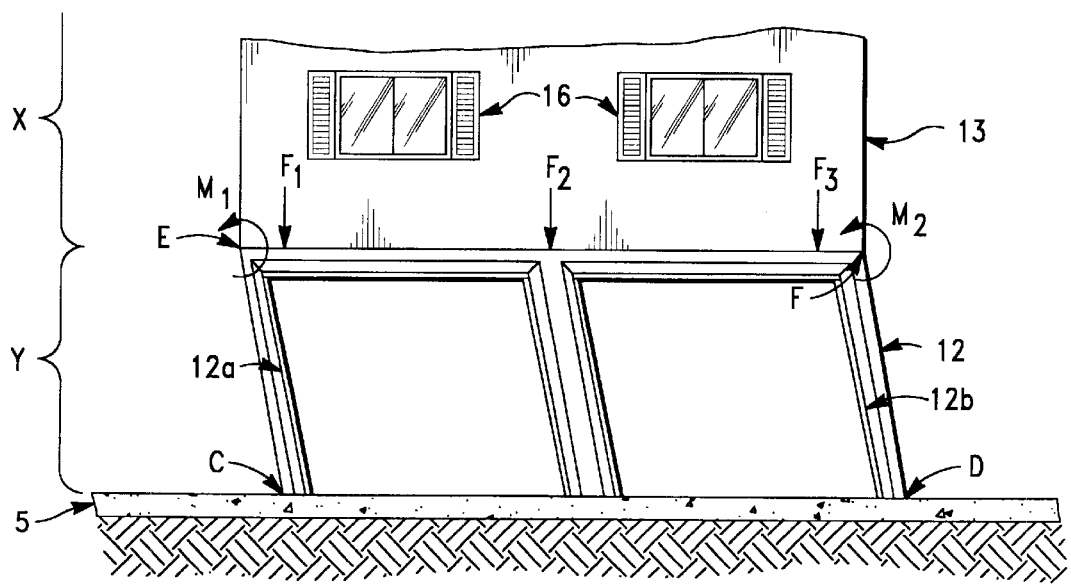
FIG. 4 is a schematic plan view of the garage structure shown in FIG. 2, illustrating the applied forces to the structure.
Figure 3:
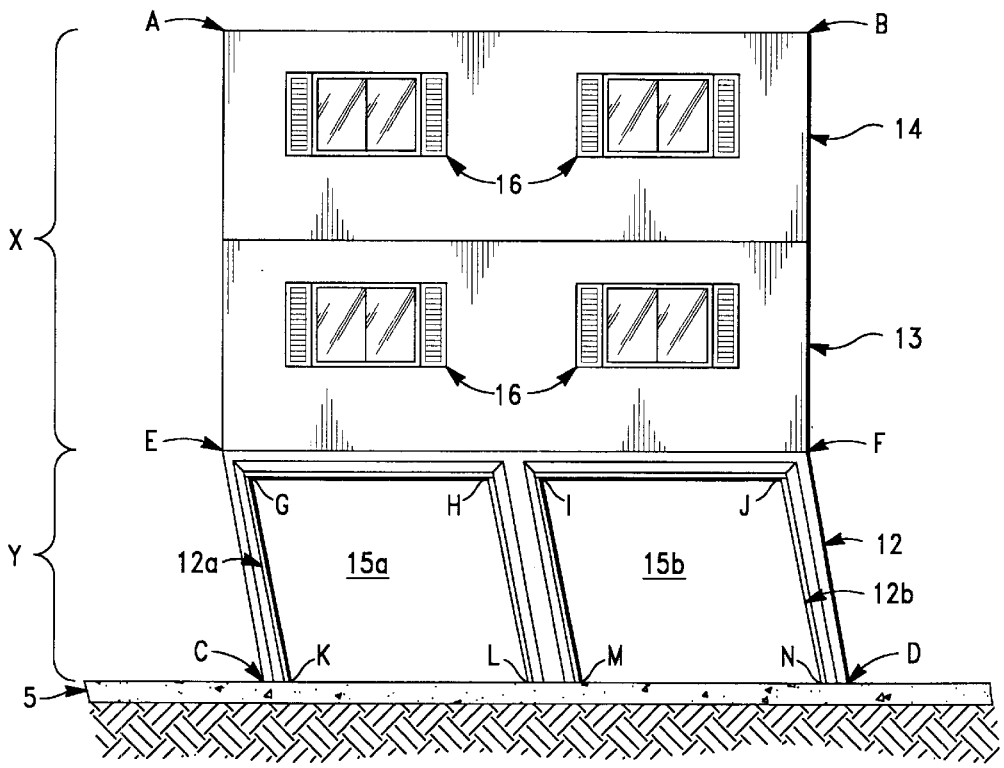
FIG. 3 is a schematic plan view of the building shown in FIG. 2, illustrating the imminent collapse of the building proximate the garage structure of the building.

Thus, during an earthquake of any significant magnitude, structure Y can, and in most instance will, collapse about points E and F prior to any occurrence of significant structural damage to structure X (see FIG. 3). The failure about points E and F is further enhanced by virtue of the downward force or load (denoted by arrows $F_1$, $F_2$ and $F_3$) exerted by structure X on structure Y. As will be appreciated by one having ordinary skill in the art, upon any significant lateral movement about points E, F, C, and D, the downward force exerted by structure X would dramatically increase the resultant moments $M_1$ and $M_2$ about points E and F, respectively (see FIG. 4).

Since the earthquake characteristics of the building defined by structure X and Y will be dependent, in significant part, on the characteristics of structure Y—the weakest link—improvements in the damping, stiffness and shear load resistance of structure Y will significantly enhance the earthquake resistance characteristics of the entire building. As will be appreciated by one having ordinary skill in the art, such improvements have been achieved by virtue of the present invention.

For earthquake resistant design optimization purposes, the supplemental damping of a building employing the embodiments of the invention described herein has been found to be in the range of approximately 3 to 20% of the inherent damping in the original building. This increase in damping can be determined by comparing the fraction of critical viscous damping in the fundamental mode of vibration of the building with and without the system(s) of the invention.

As will be appreciated by one having ordinary skill in the art, a building opening, such as the opening 12a defined by points G, H, K, and L in FIG. 3, incorporating the embodiments of the invention described herein will also exhibit an increase in shear stiffness or shear load resistance. Indeed, Applicants have found the increase in shear load resistance/stiffness of the building to be in the range of approximately 2 to 35%. This increase in resistance/stiffness was determined by comparing the relative (inherent) stiffness between two points proximate the building opening 12a with and without the system(s) of the invention.

It will be appreciated by one having skill in the art that the system is also capable of providing an increase in shear load resistance greater than 35% (e.g., 80%) if, for example, the inherent stiffness of the building is minimal.

Figure 7B:
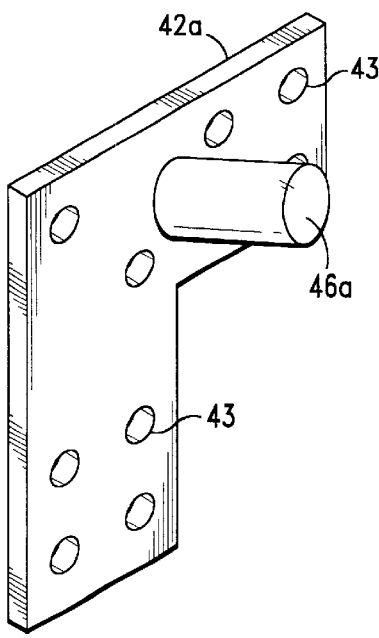
FIGS. 7B and 7C are perspective views of the upper frame reinforcement members according to the invention.
Figure 8A:
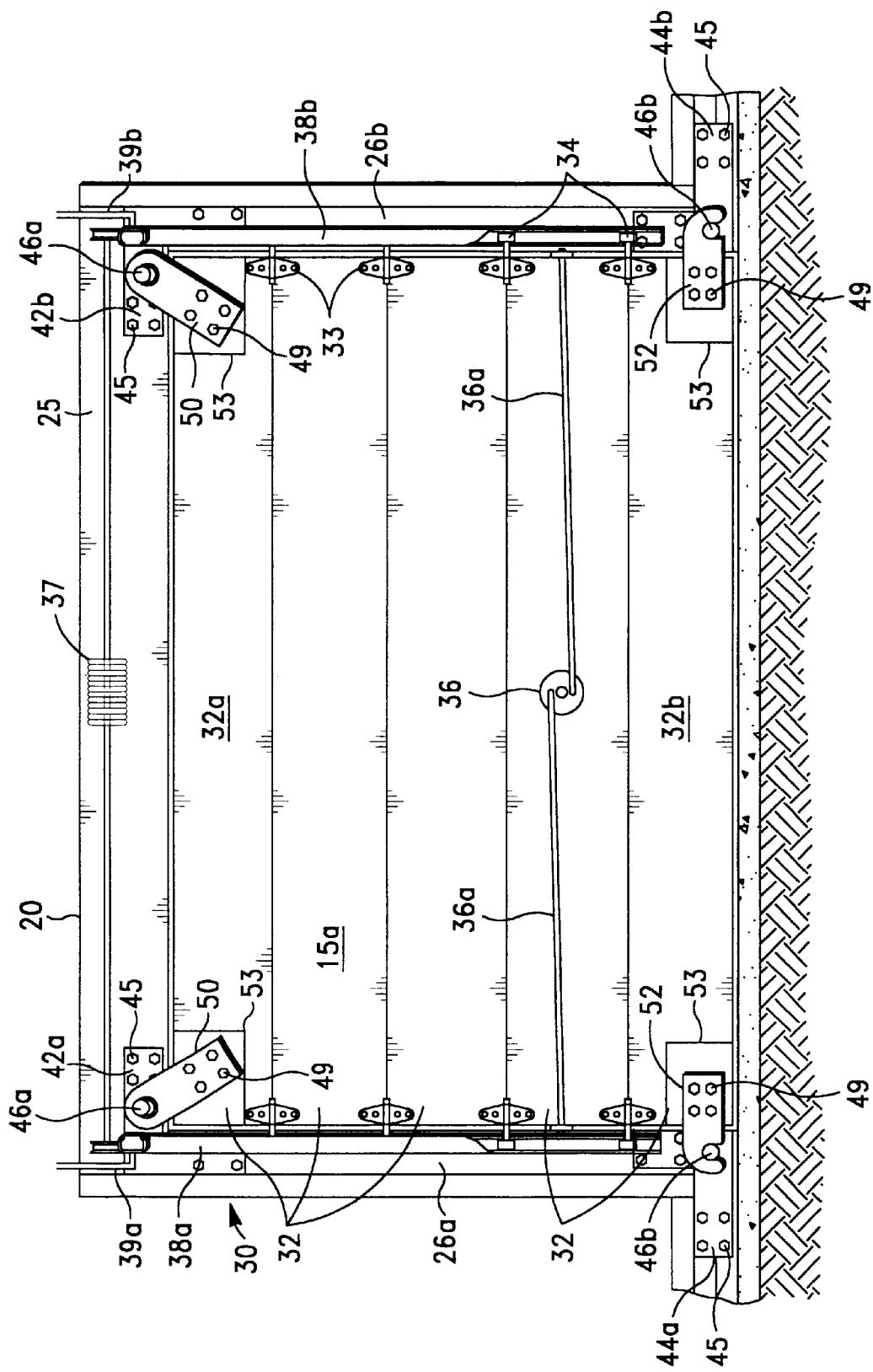
FIG. 8A is a front elevational view of a first embodiment of the structural reinforcement system of the invention.

Referring now to FIG. 8A, there is shown a first embodiment of the structural reinforcement system of the invention. In this embodiment, a pair of upper frame reinforcement members 42a, 42b and a pair of lower frame reinforcement members 44a, 44b, are provided. According to the invention, the frame reinforcement members 42a, 42b, 44a, 44b are attached to 26b) and, hence, enhance the structural integrity (e.g., rigidity) of the frame 20 at points G', H', K' and L' (see FIG. 7A) and facilitate the novel load transfer means of the invention.

As illustrated in FIGS. 7A, the frame reinforcement members 42a, 42b are attached to the header 25 by conventional means. The frame reinforcement members 44a, 44b are similarly attached to respective vertical supports 26a, 26b by conventional means. In a preferred embodiment, the frame reinforcement members 42a, 42b, 44a, 44b, are bolted to the frame 20 via a plurality of conventional bolts 45. In an additional envisioned embodiment, not shown, the lower frame reinforcement members 44a, 44b are also adapted to be attached to the foundation.

Figure 7C:
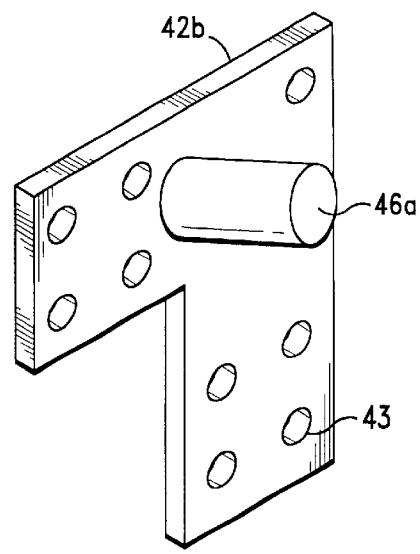
Figure 7D:
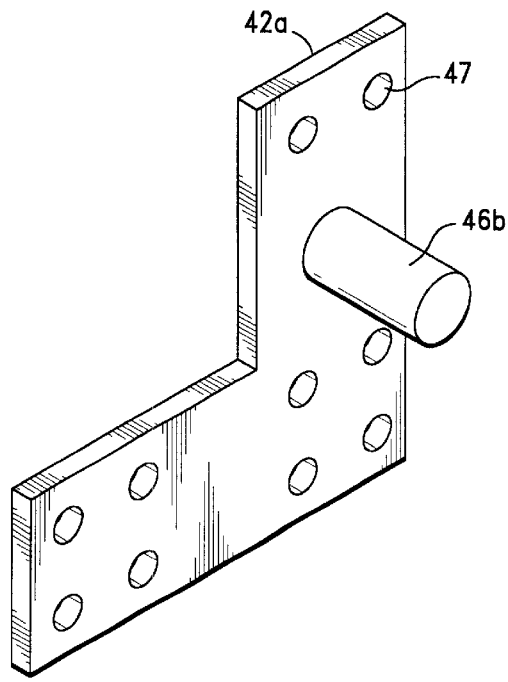
FIGS. 7D and 7E are perspective views of the lower frame reinforcement members according to the invention.
Figure 7E:
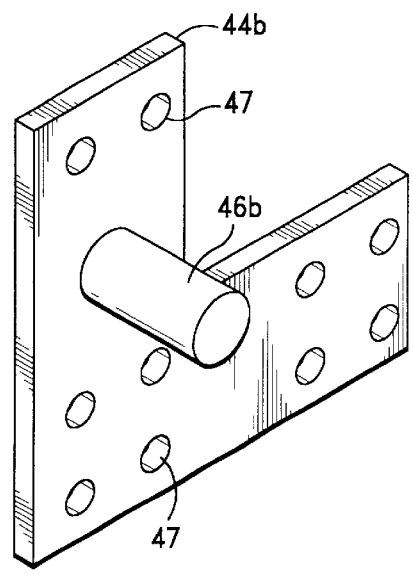

Referring now to FIGS. 7B and 7C, each of the upper frame reinforcement members 42a, 42b are provided with a plurality of holes 43 adapted to receive the bolts 45, and guide pins 46a adapted to slideably engage the upper garage door shear members 50, discussed below. As illustrated in FIGS. 7E and 7D, the lower frame reinforcement members 44a, 44b are similarly provided with a plurality of holes 47, adapted to receive the bolts 45, and guide pins 46b, adapted to receive the lower garage shear members 52.

Figures 8B, 8C:
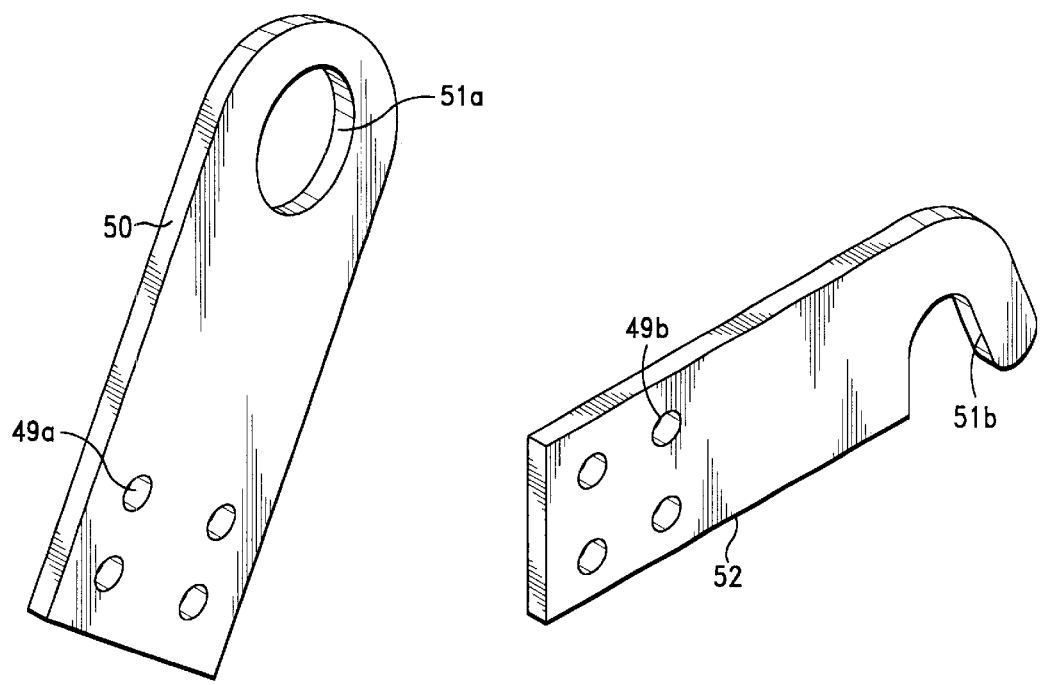
FIG. 8B is a perspective view of the panel upper shear members according to the invention.
FIG. 8C is a perspective view of the panel lower shear members according to the invention.

As illustrated in FIG. 8A, upper garage door shear members 50 and lower garage shear members 52 are also provided. Referring to FIG. 8B, the upper shear members 50 are provided with a plurality of holes 49a adapted to receive mounting bolts 49 and are attached to the upper panel 32a proximate opposing ends. According to the invention, the shear members 50 are positioned such that each shear member engagement hole 51a engages a respective reinforcement member guide pin 46a when the garage door (or panel) 15a is in the closed position.

The lower shear members 52 are similarly attached to the lower panel 32b of the garage door 15a. The shear members 52 are similarly provided with a plurality of holes 49b adapted to receive mounting bolts 49 (see FIG. 8C) and are positioned such that each shear member engagement portion 51b slideably receives a respective lower reinforcement member guide pin 46b when the garage 15a is in the closed position.

As will be appreciated by one having ordinary skill in the art, various means of attaching the shear members 50, 52 to the garage door 15a may be employed within the scope of the invention. In a preferred embodiment, the shear members 50, 52 are attached to reinforcement plates 53, which are also attached to the garage door 15a by conventional means.

Figure 9A:
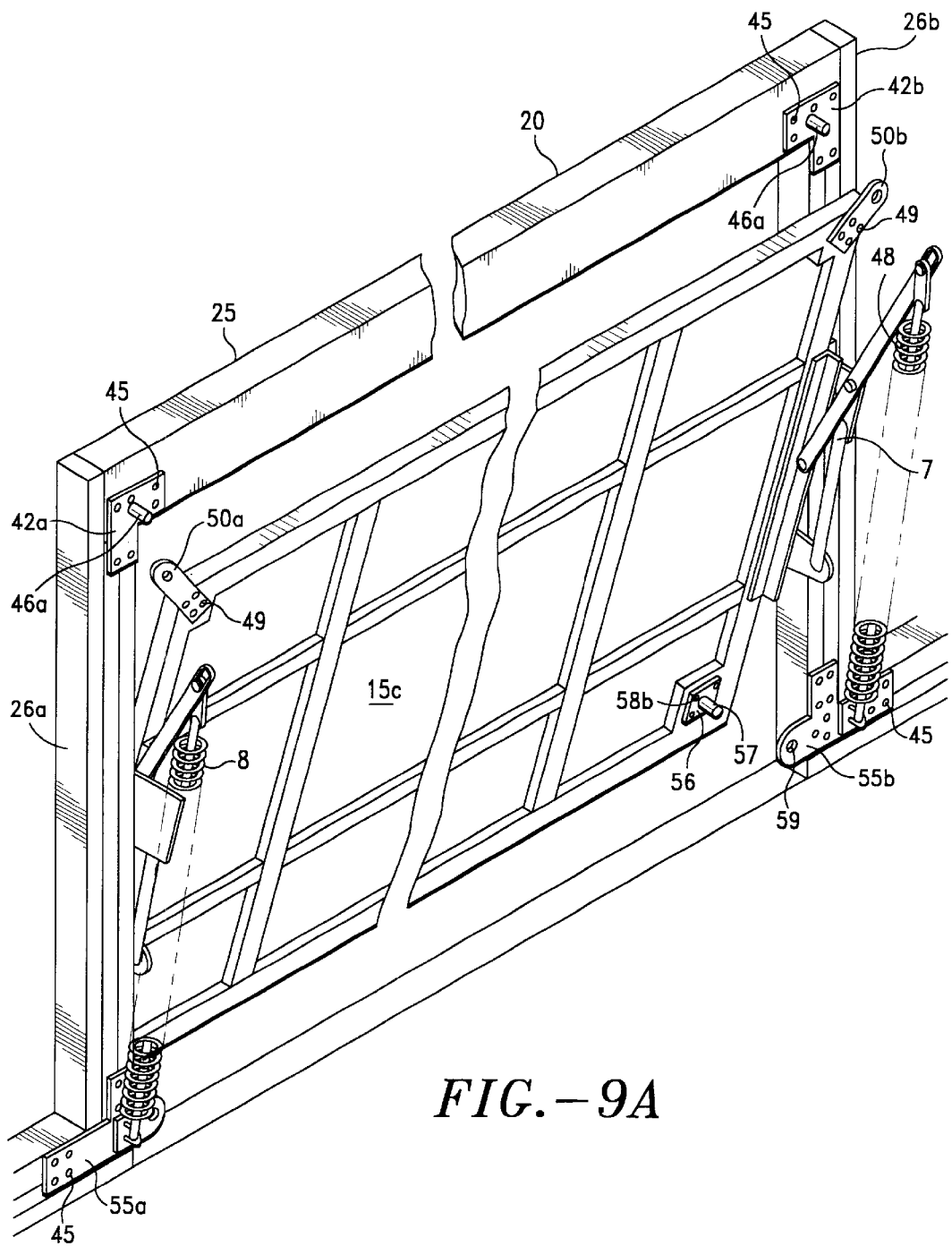
FIG. 9A is a partial perspective view of an additional embodiment of the structural reinforcement system of the invention.

Referring now to FIG. 9A, there is shown a further embodiment of the invention described above, incorporated in a solid panel garage system. As illustrated in FIG. 9A, the system includes a solid panel door 15c, typically constructed of wood or aluminum, a conventional hinge assembly 7 and a spring system 8.

According to the invention, the system includes the upper frame reinforcement members 42a, 42b and upper shear members 50 (described above), which are attached to the door 15c via bolts 49. The system further includes a further embodiment of lower reinforcement members 55a, 55b and lower panel shear members 56 (see FIGS. 9B–9D).

Figure 9B:
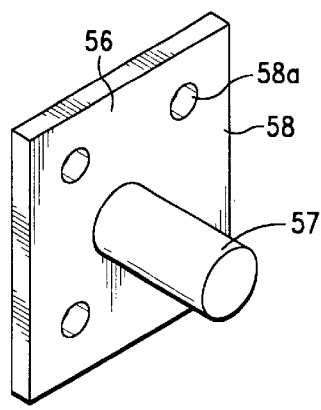
FIG. 9B is a perspective view of an additional embodiment of the panel lower shear members according to the invention.

As illustrated in FIG. 9B, the lower panel shear members 56 include guide pins 57 projecting outwardly from shear member mounting plates 58. According to the invention, the mounting plates 58 are preferably provided with mounting holes 58a adapted to receive mounting bolts 58b and are disposed on the panel 15c proximate the lower corners thereof. The lower shear members 56 are positioned on the panel 15c such that the pins 57 slideably engage the guide holes 59 provided on the lower reinforcement members 55a, 55b (see FIG. 9A).

Figure 9C:
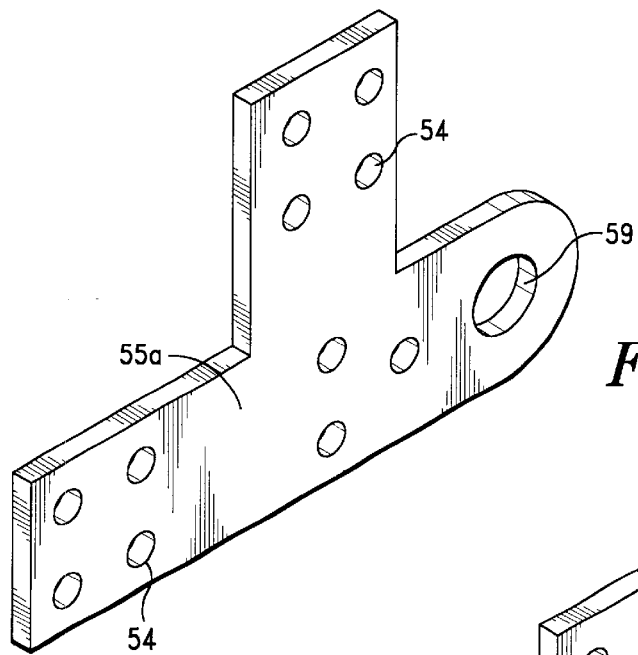
FIGS. 9C and 9D are perspective views of an additional embodiment of frame reinforcement members according to the invention.
Figure 9D:
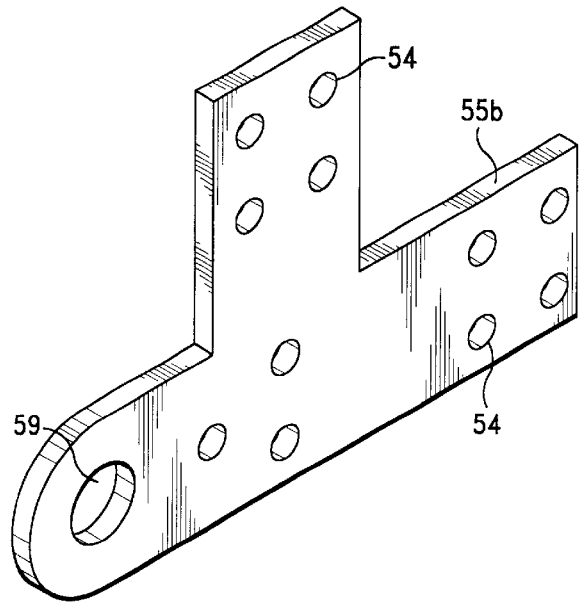

As illustrated in FIGS. 9C and 9D, the lower reinforcement members 55a, 55b are also provided with a plurality of mounting holes 54 adapted to receive the mounting bolts 45, discussed above. According to the invention, the lower reinforcement members 55a, 55b are positioned in a similar location by similar means (i.e., mounting bolts 45) as the reinforcement members 44a, 44b shown in FIG. 7A.

Figure 15:
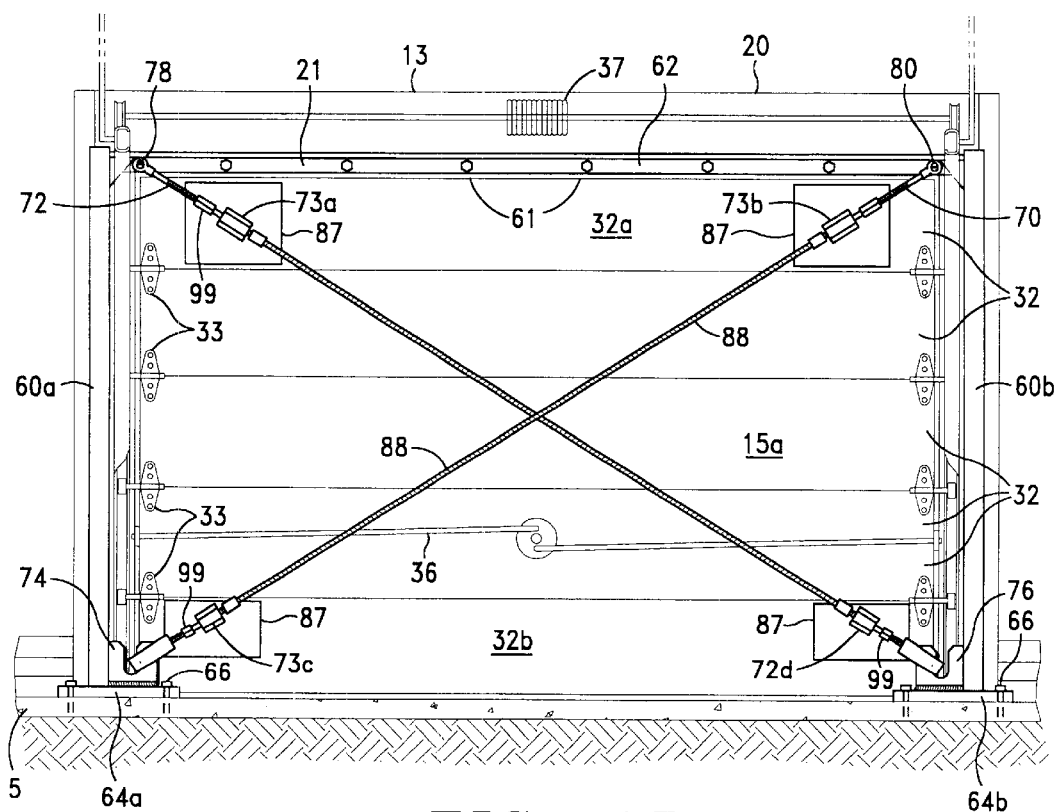
FIG. 15 is a front elevational view of an additional embodiment of the structural reinforcement system of the invention.

Referring now to FIG. 15, there is shown a further embodiment of the structural reinforcement system of the invention. In this embodiment, the reinforcement system includes a reinforcing frame structure 21 comprising side reinforcing members 60a, 60b and a top reinforcing member 62 (see FIG. 10A).

According to the invention, the reinforcing frame structure 21 can be constructed out of various high strength materials, such as steel and aluminum. In a preferred embodiment, the frame structure 21 is constructed out of steel.

Figure 16A:
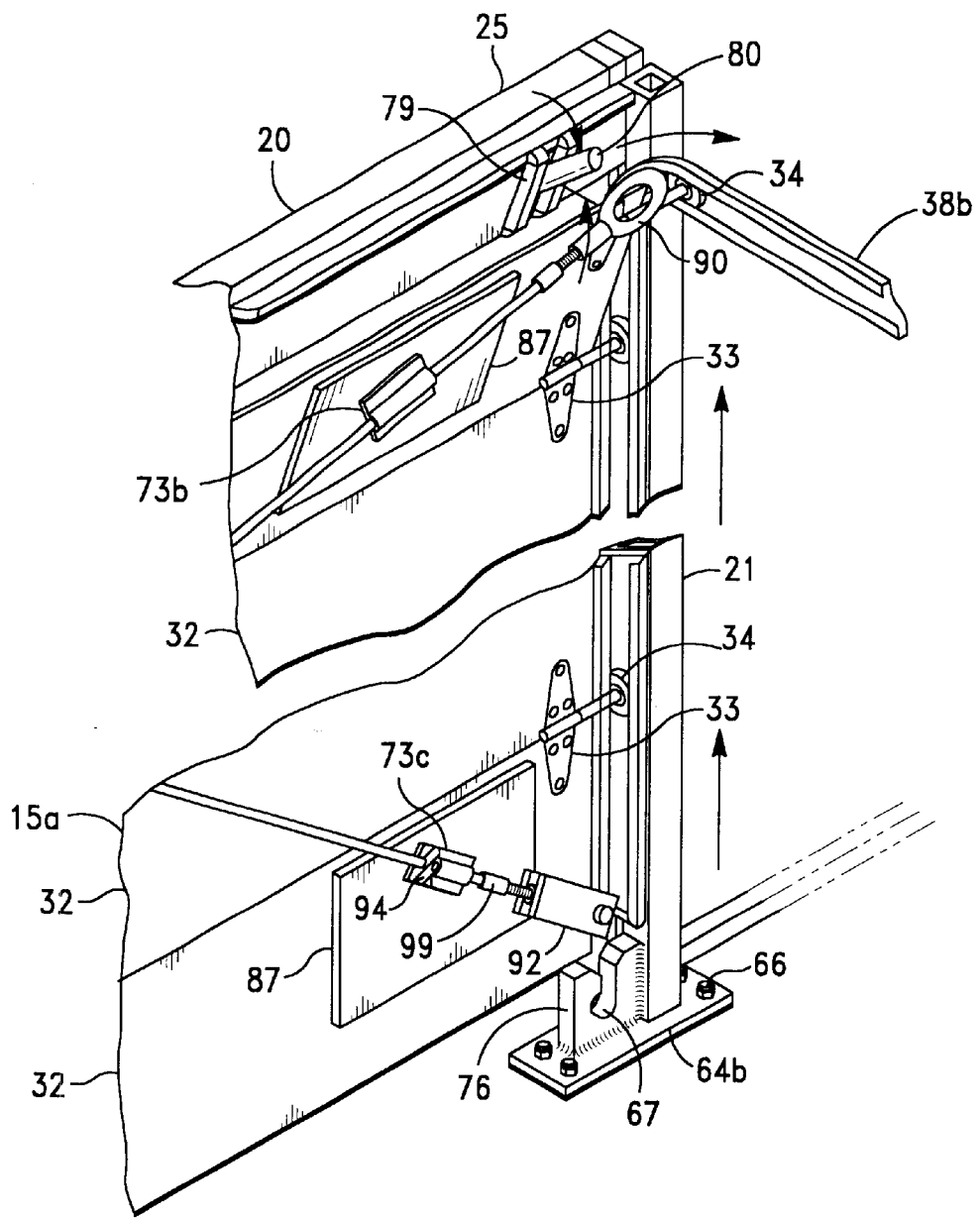
FIG. 16A is a partial perspective view of the embodiment of the invention shown in FIG. 15, illustrating the release of the structural reinforcement system according to the invention.

The reinforcing frame structure 21 can also comprise various shaped components, such as the substantially tabular shaped top reinforcing member 62 and side reinforcing members 60a, 60b, shown in FIGS. 10A, 15 and 16A. The frame structure 21 components can also comprise substantially angled plate, such as the reinforcing frame components illustrated in FIGS. 12–14, discussed below.

As illustrated in FIGS. 10A and 15, the top reinforcing member 62 is attached to the header 25 by conventional means. In a preferred embodiment, the top reinforcing member 62 is bolted to the header 25 via a plurality of conventional bolts 61.

As illustrated in FIG. 10A, the side reinforcing members 60a, 60b are secured to the top reinforcing member 62 by conventional means. In a preferred embodiment, one end of each side reinforcing member 60a, 60b is welded to opposing ends of the top reinforcing member 62. As will be appreciated by one having ordinary skill in the art, the side reinforcing members 60a, 60b can also be operatively attached to the vertical support members 26a, 26b.

Referring now to FIG. 10B, a pair of substantially horizontal anchor plates 64a, 64b are also provided that are preferably secured to each member 60a, 60b proximate the anchor ends 60c, 60d thereof. Each anchor plate 64a, 64b includes a plurality of engagement holes 65 adapted to receive and position bolts 66, which secure the side reinforcing members 60a, 60b to the foundation 5.

Figure 11A:
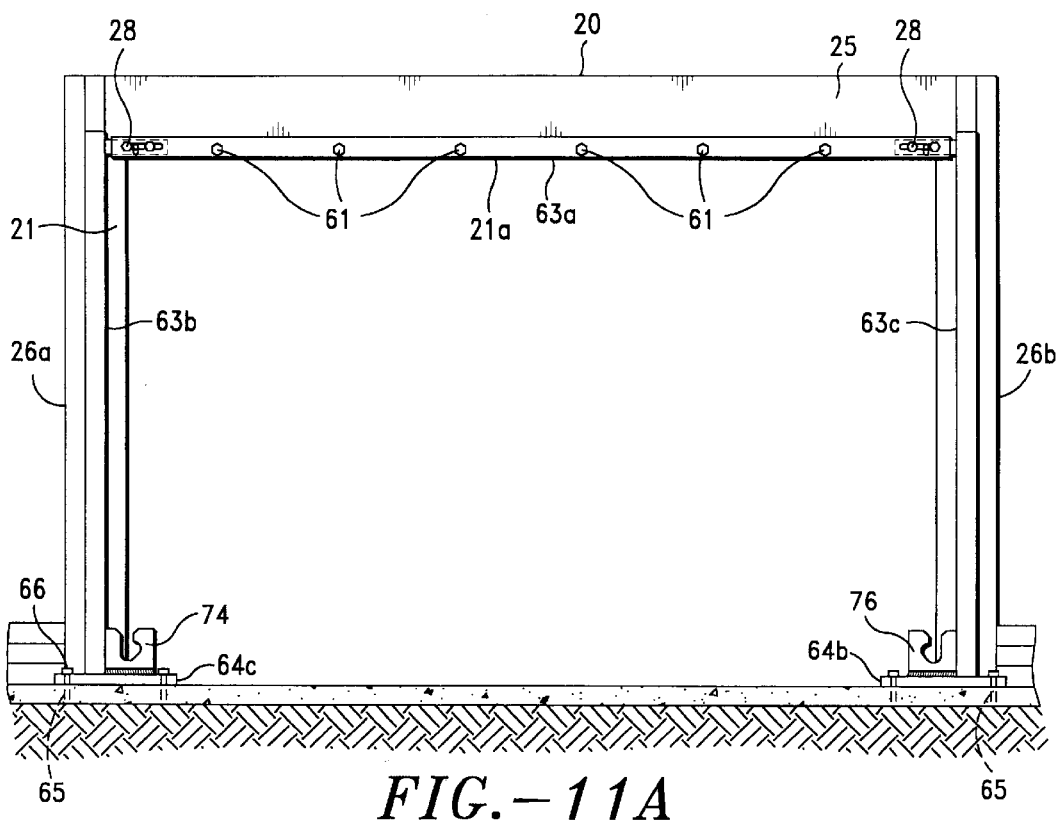
FIG. 11A is a front elevational view of an adjustable reinforcing frame structure according to the invention.
Figure 11B:
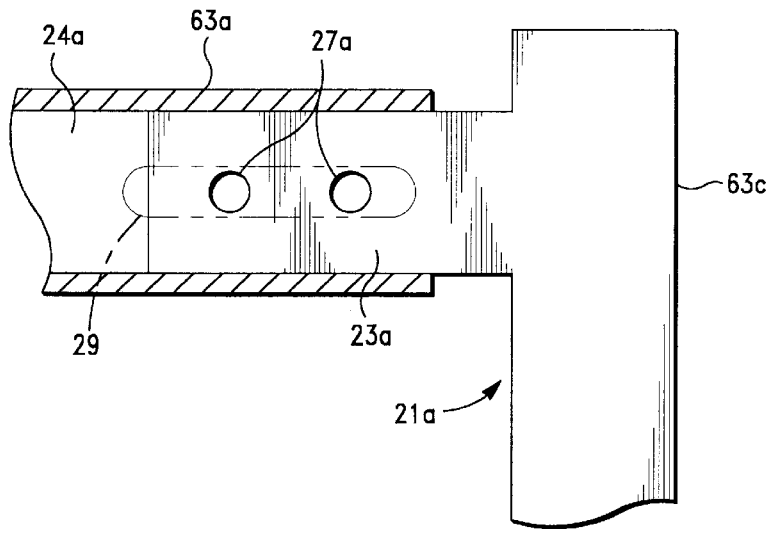
FIGS. 11B and 11C are partial section views of the adjustable reinforcing frame structure shown in FIG. 11A.
Figure 11C:
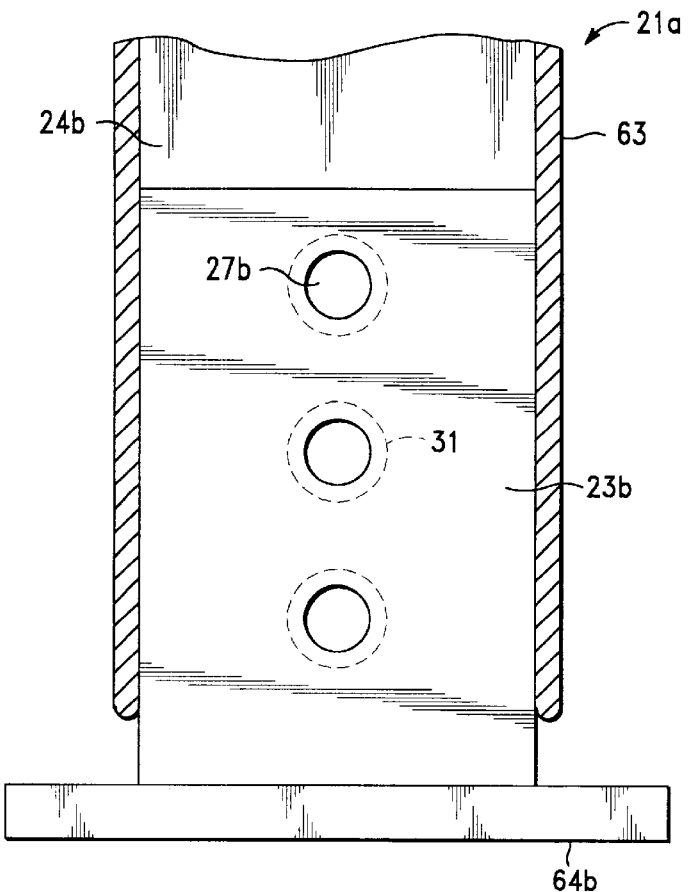

In an additional envisioned embodiment of the invention, illustrated in FIGS. 11A–11C, an adjustable reinforcing frame structure 21a is provided. As illustrated in FIG. 11A, the adjustable frame structure 21a preferably includes the same basic frame structure illustrated in FIG. 10A. However, as illustrated in FIG. 11B, in this embodiment, the side reinforcing members 63b, 63c include inwardly projecting adjustment arms 23a that are designed and adapted to slideably engage the interior engagement portions 24a of the top reinforcing member 63a disposed on each end thereof. The adjustment arms 23a are also preferably provided with a plurality of threaded holes 27a adapted to receive bolts 28.

As illustrated in FIG. 11A, the top reinforcing member 63a is further provided with adjustment slots 29 disposed proximate the engagement portions 24a. The slots 29 are adapted to slideably receive bolts 28, while facilitating the adjustable means of the structure 21a.

According to the invention, the adjustable frame means can also include adjustable side reinforcing members 63b, 63c to facilitate variable height adjustment of the frame structure 21a. Referring now to FIG. 11C, there is shown one embodiment of adjustable side reinforcing members 63b, 63c.

In the noted embodiment, the side reinforcing members 63b, 63c similarly include interior engagement portions 24b disposed on the lower ends thereof. The engagement portions 24b are adapted to slideably receive the upwardly projecting adjustment arms 23b that are secured to the anchor plates 64a, 64b.

As illustrated in FIG. 11C, the adjustment arms 23b are provided with a plurality of substantially vertically aligned threaded holes 27b, that are similarly adapted to receive bolts 28. The side reinforcing members 63b, 63c are also provided with a plurality of substantially vertically aligned adjustment holes 31 that are adapted to receive bolts 28, and facilitate alignment and engagement of the bolts 28 in holes 27b.

As will be appreciated by one having ordinary skill in the art, the structure 21a illustrated in FIGS. 11A–11C is but one means which may be employed to achieve the adjustable frame means of the invention.

Figure 12:
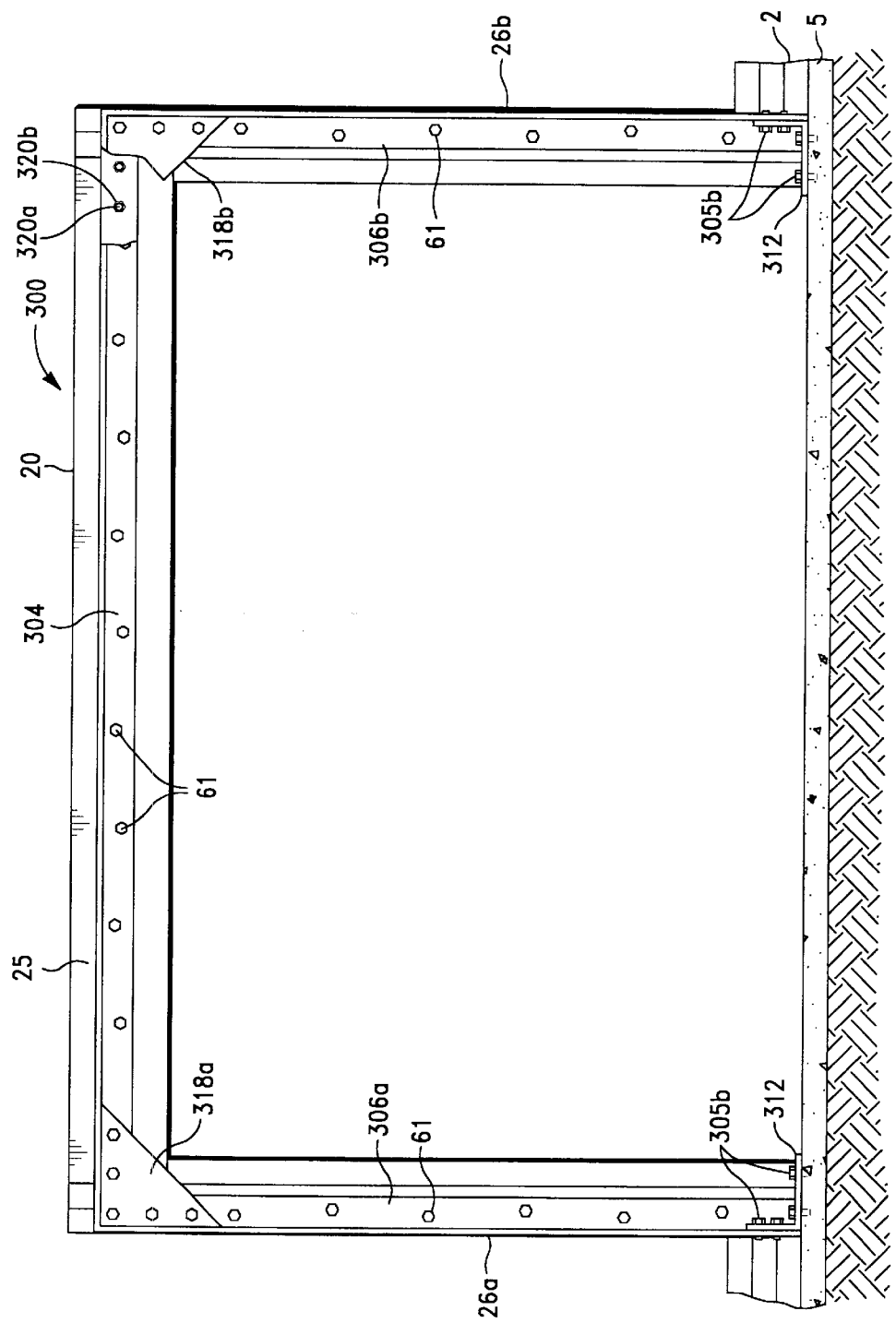
FIG. 12 is a front elevational view of an additional embodiment of a reinforcing frame structure according to the invention.
Figure 13:
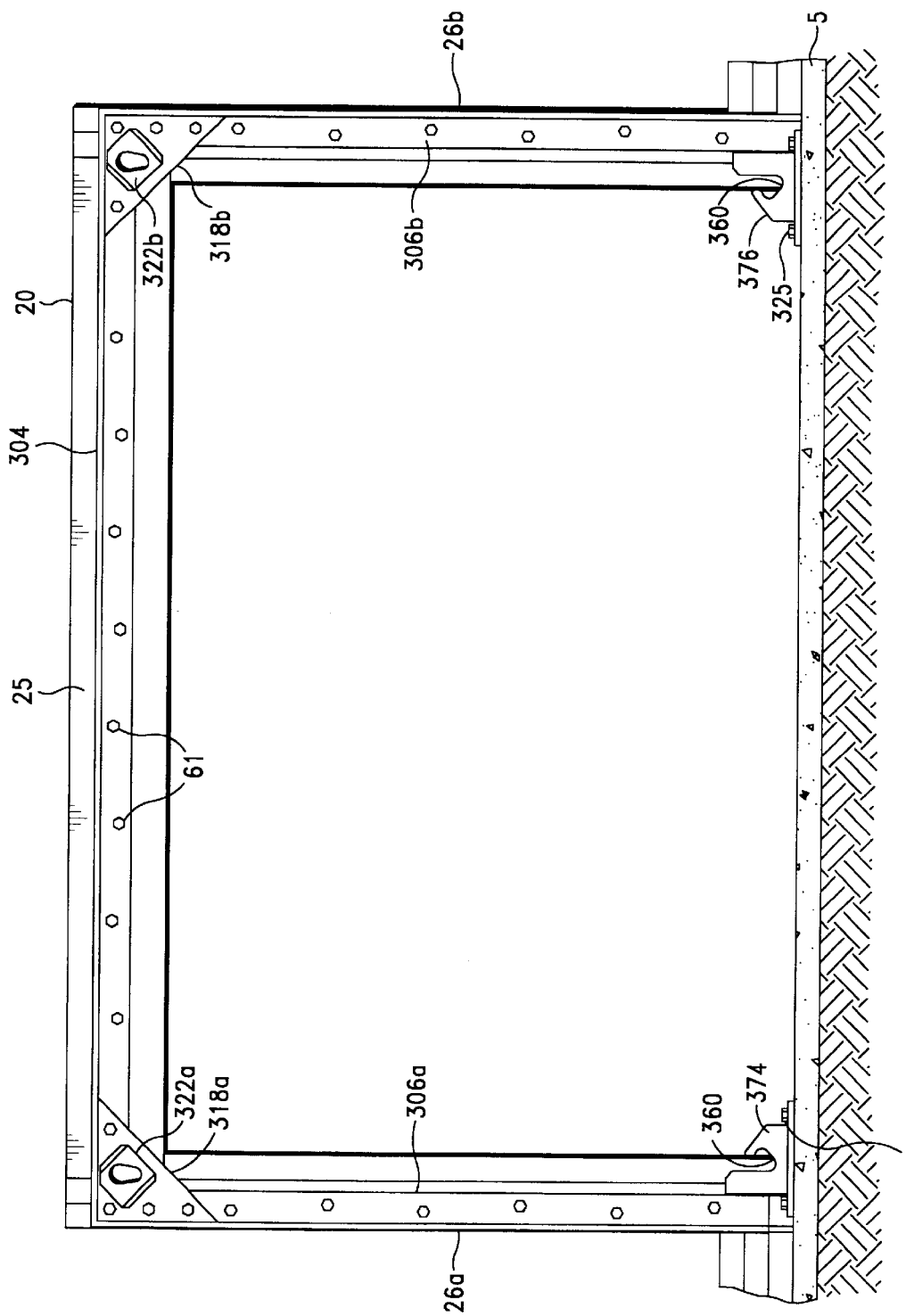
FIG. 13 is a front elevational view of the reinforcing frame structure shown in FIG. 12, illustrating the placement of the pin engagement section of the corner anchors and load collectors according to the invention.
Figure 14:
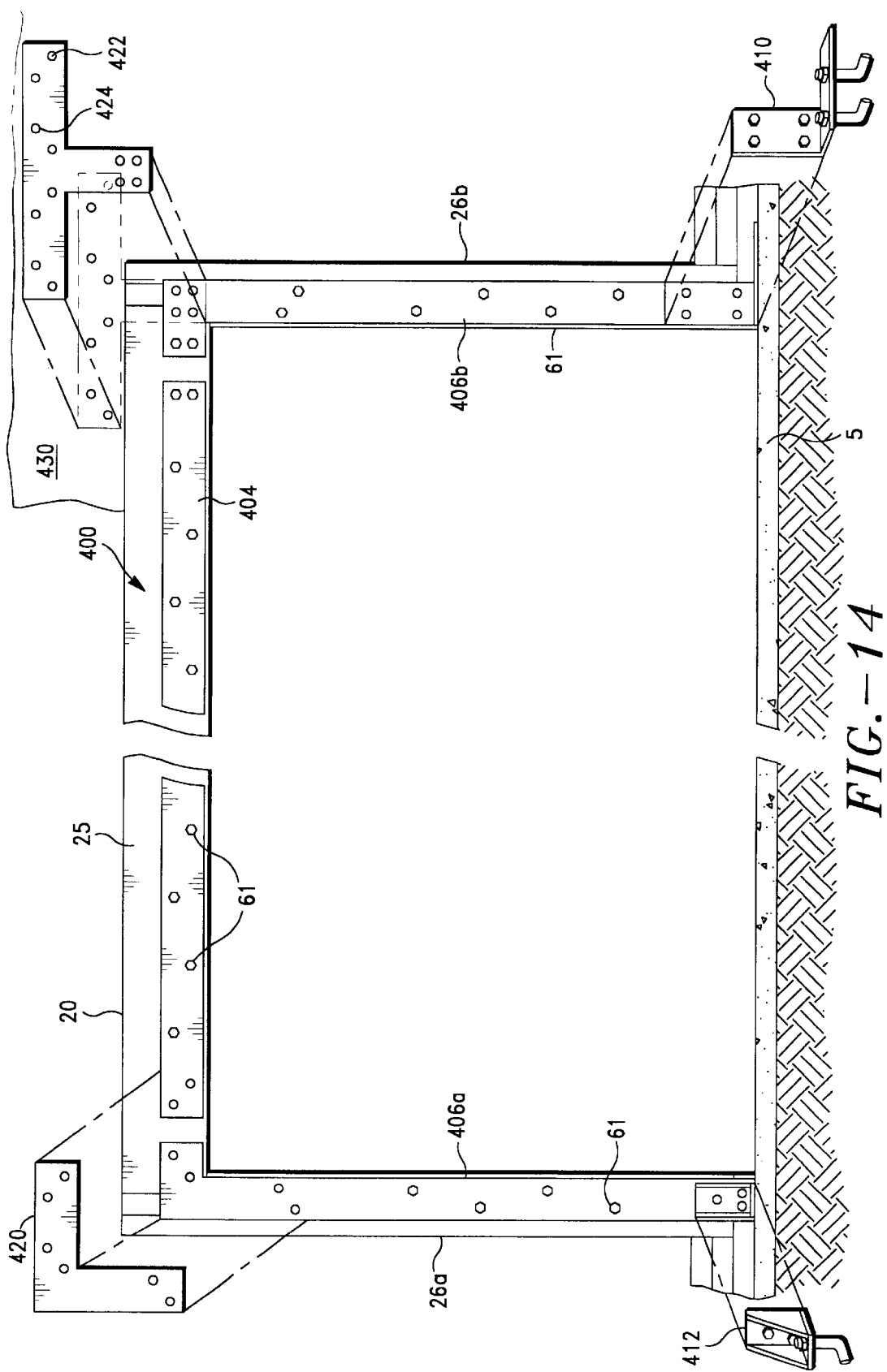
FIG. 14 is a front elevational view of yet another embodiment of a reinforcing frame structure according to the invention.

Referring now to FIGS. 12–14, there are shown additional embodiments of reinforcing frame structures of the invention. Referring first to FIG. 12, in this embodiment, the frame structure 300 similarly includes a header section 304 and vertical support sections 306a, 306b, which comprise substantially angled plate.

The header section 304 is preferably bolted to the building header 25 via a plurality of bolts 61. The vertical support sections 306a, 306b are attachable to the vertical supports 26a, 26b and/or directly anchored to the "sill" 2 via a conventional bracket, not shown, or to the foundation 5 via brackets 312 and bolts 305b.

As illustrated in FIG. 12, a pair of corner anchors 318a, 318b are also provided. The corner anchors 318a, 318b are provided with a plurality of holes 320a adapted to be aligned with mating holes 320*b* on the header section 304 and support sections 306*a*, 306*b* when the anchors 318*a*, 318*b* are positioned on the frame structure 300. The holes 320*a*, 320*b* are further adapted to receive bolts 61.

Referring now to FIG. 14, there is shown yet another embodiment of a reinforcing frame structure 400 according to the invention. In this embodiment, the structure 400 includes a header member 404 and a pair of substantially "L" shaped vertical support members 406*a*, 406*b*; each of the members 404, 406*a*, 406*b* comprising a substantially flat plate.

The header member 404 is similarly bolted to the header 25 via bolts 61. The vertical support members 406*a*, 406*b* are preferably attached to the vertical supports 26*a*, 26*b* via bolts 61 and/or directly anchored to the foundation 5 via bracket 412 and/or bracket 410.

As illustrated in FIG. 14, the noted reinforcing frame further includes at least one substantially "L" shaped corner brace 420 and at least one substantially "T" shaped wall brace 422. The corner brace 420 is adapted to be bolted to the header 25 and one or both of the vertical supports 26*a*, 26*b* in conjunction with the header member 404 and vertical support members 406*a*, 406*b*, proximate the adjoining ends thereof.

The "T" shaped wall brace 422 is similarly adapted to be bolted to the header 25 in conjunction with one or both of the vertical support members 406*a*, 406*b*. The "T" brace 422 is also provided with a plurality of holes 424 adapted to receive retaining bolts, not shown, to facilitate engagement of the "T" brace 422 to the adjoining wall 430.

Referring back to FIG. 15, the noted embodiment of the structural reinforcement system preferably includes adjustable load transfer members or stay braces 70, 72, load transfer member guides 73*a*–73*d*, load collectors 74, 76, and header pins 78, 80. According to the invention, the header pins 78, 80 are secured by conventional means to the top reinforcing member 62 proximate each respective side-reinforcing member 60*a*, 60*b*. In a preferred embodiment, angled mounting plates 79 are provided to facilitate engagement (i.e. welding) of the pins 78, 80 to the top reinforcing member 62 (see FIG. 16A).

Referring now to FIG. 16A, each of the load collectors 74, 76 of the invention are secured to a respective anchor plate 64*a*, 64*b*. According to the invention, the load collectors 74, 76 can also be attached to a respective side reinforcing member 60*a*, 60*b* proximate the anchor ends 60*c*, 60*d* thereof. In a preferred embodiment, each load collector 74, 76 is welded to a respective anchor plate 64*a*, 64*b*, which is secured to the foundation 5.

Figure 18:
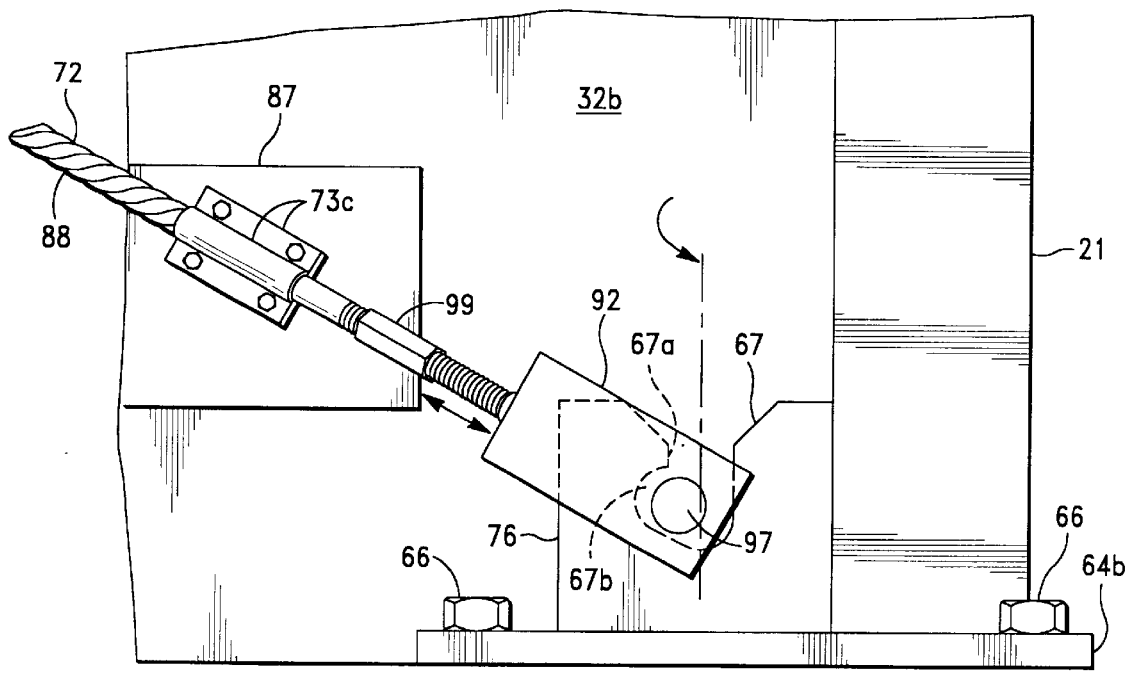
FIG. 18 is a partial elevational view of the embodiment of the invention shown in FIG. 15, illustrating the engagement of a load collector engagement member and load collector according to the invention.

According to the invention, each load collector 74, 76 comprises a substantially planar plate with an internal engagement portion 67 adapted to receive and secure one end of respective load transfer member 70, 72 (see FIG. 18). In a preferred embodiment, the engagement portion 67 comprises a receiving slot 67*a* positioned on a substantially vertical plane and an inwardly directed engagement recess 67*b* disposed proximate the end of the receiving slot 67*a*.

As will be appreciated by one having skill in the art, various load collector designs may be employed within the scope of the invention. For example, each load collector may comprise a substantially hook-shaped structure 84, such as that illustrated in FIG. 20, or the structure shown in FIG. 24, discussed in detail below.

In additional envisioned embodiments of the invention, not shown, the load connectors 74, 76 can include a ramped entry section adapted to slidably engage and pre-tension the load transfer members 70, 72 upon engagement thereof.

As illustrated in FIG. 15, the load transfer members 70, 72 are preferably disposed on the interior side of the interconnected panels 32 (or garage door 15*a*). The load transfer members 70, 72 are preferably maintained in an optimum position via the load transfer member guides 73*a*–73*d*, which are preferably secured to panel reinforcing plates 87. According to the invention, the guides 73*a*–73*d* are preferably secured to the interior side of a panels 32*a*, 32*b* proximate the ends thereof. In a preferred embodiment, each guide 73*a*–73*d* includes a substantially cylindrical cable lumen 94 adapted to receive and slideably position the load transfer members 70, 72 (see FIG. 16A).

Figure 16B:
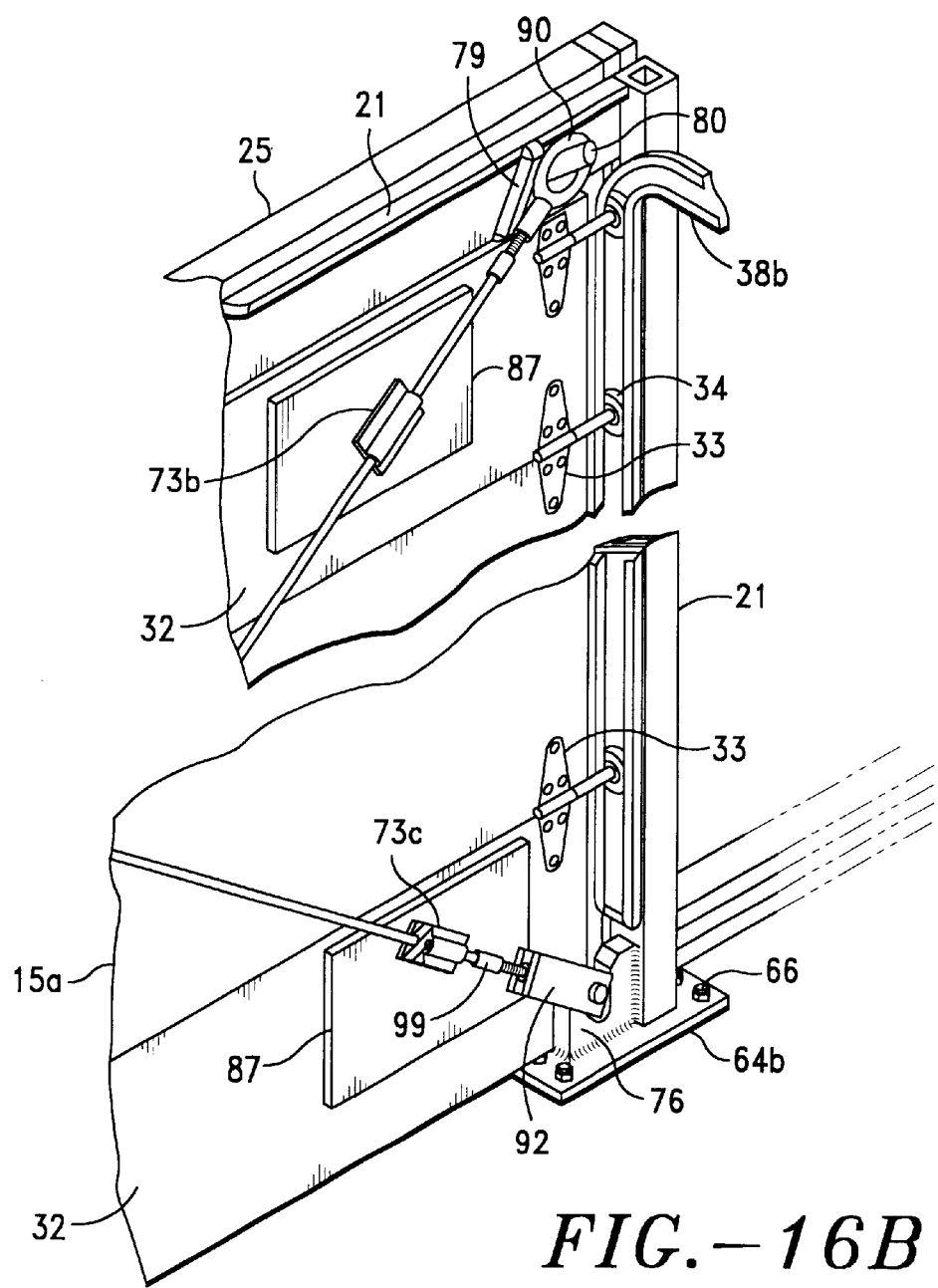
FIG. 16B is a partial perspective view of the embodiment of the invention shown in FIG. 15 in which the structural reinforcement system is in a closed, load-bearing position.

Referring to FIGS. 16A and 16B, each load transfer member 70, 72 is provided with a pin engagement ring 90 on one end adapted to releasably engage a respective header pin 78, 80 and a load collector engagement member 92 disposed on the opposite end of the members 70, 72 which is adapted to releasably engage a respective load collector 74, 76, when the garage door 15*a* is in a closed position (see FIGS. 16A and 16B).

Figure 19:
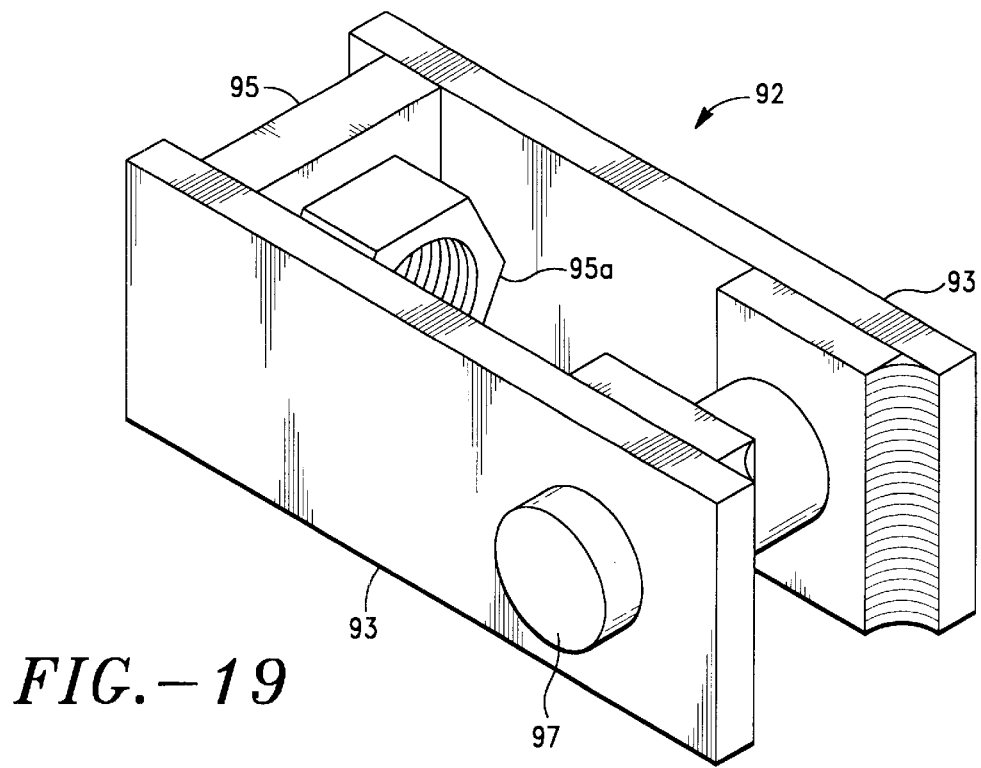
FIG. 19 is a perspective view of a load collector engagement member according to the invention.

Referring to FIG. 19, the load collector engagement member 92 preferably comprises a substantially box shaped structure having a pair of substantially parallel opposing side plates 93, a bottom plate 95, having a nut 95*a* attached thereto adapted to engage the load transfer member adjusters 99 (discussed below), and an engagement rod 97 disposed proximate the top of the box-structure adapted to slideably engage the load collector engagement portion 67.

Figure 17:
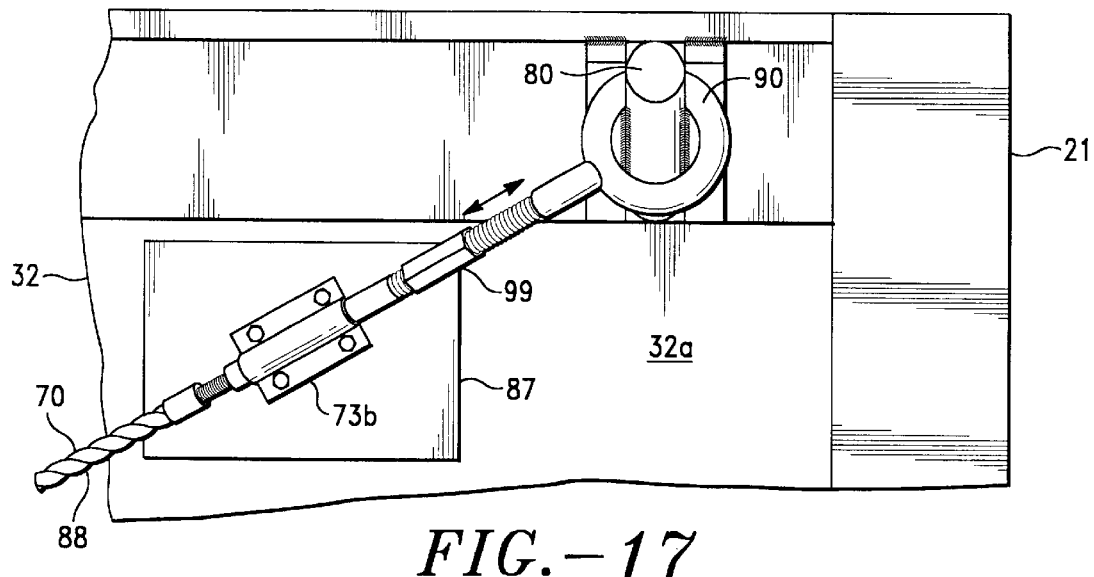
FIG. 17 is a partial elevational view of the embodiment of the invention shown in FIG. 15, illustrating the engagement of a header pin and load transfer member ring according to the invention.

Referring to FIGS. 17 and 18, each end of the load transfer members 70, 72 is further provided with threaded load transfer member adjusters 99, which are adapted to connect each pin engagement ring 90 and load collector engagement member 92 to a respective load transfer member 70, 72 on each end thereof. The threaded adjusters 99 also facilitate adjustments in the operational length of each load transfer member 70, 72 and are also employed to compliment the variable shear load resistance/stiffness and damping means of the invention (discussed below).

According to the invention, the load transfer members 70, 72 comprise various shapes, construction and materials to achieve the variable shear load resistance and damping means of the invention. For example, if one desires minimal shear load resistance or stiffness, load transfer members 70, 72 having a minimal strength in the range of approximately 10–20 kips or less are employed. If greater shear load resistance is desired, one can employ load transfer members 70, 72 having a nominal strength in the range of 35–45 kips or greater. One can further employ load transfer members 70, 72 having the noted nominal strengths constructed out of cable or solid rod to further tailor the resultant seismic characteristics of the system and, hence, adjoining structure.

Further, if one desired variable shear load resistance and/or damping in the building, one could adjust the threaded adjusters 99 to a minimal pre-tension state (e.g., slack in system). As a result, when an external load having magnitude $F_L$ is applied to the building, the inherent shear load resistance and damping characteristics of the building would primarily define the seismic characteristics of the building.

If the external load exceeds $F_L$, the load transfer members 70, 72 would reach the desired "fully engaged" or pre-tension state to provide the unique load transfer characteristics of the system and a desired level of supplemental shear load resistance/stiffness and damping.

It will thus be appreciated that various load transfer member 70, 72 shapes, such as hex, square, and round rods; construction, such as cable, solid and hollow rods; and materials, such as steel, aluminum and high strength polymers, may be employed within the scope of the invention; provided, however, that such materials have a nominal strength in the range of 5 to 45 kips. It will further be appreciated that "non-adjustable" load transfer members having various shapes and construction may also be employed to achieve the variable shear load resistance and damping means of the invention.

Figures 31, 32:
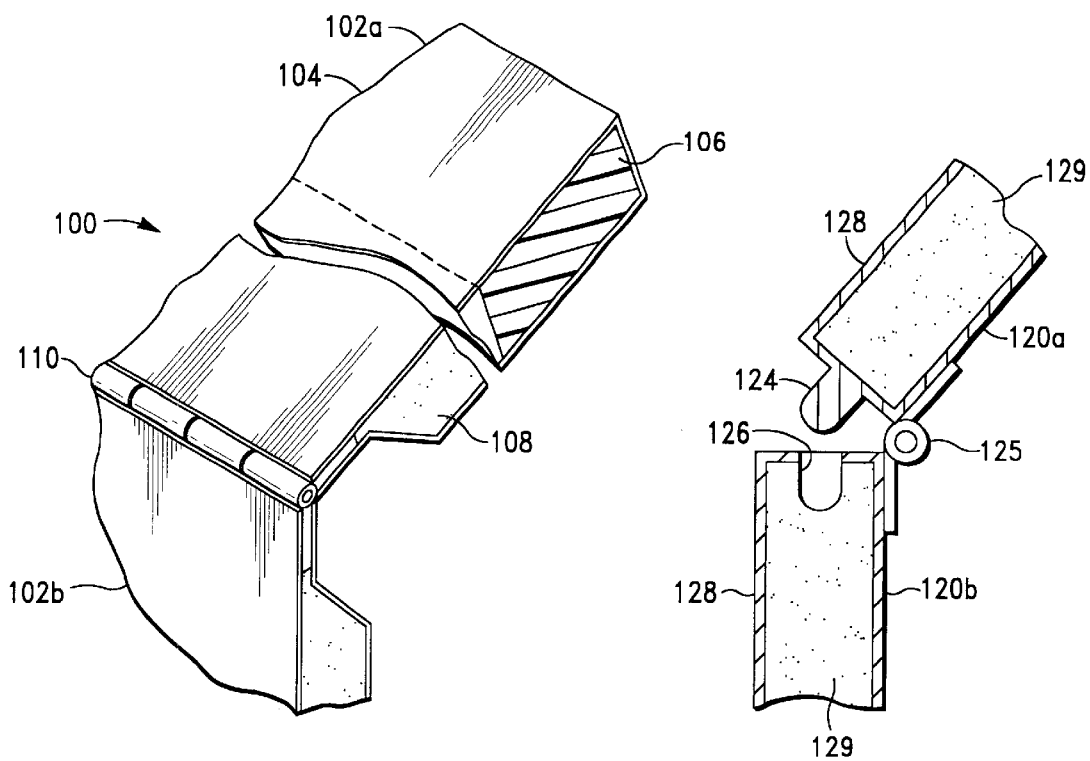
FIG. 31 is a partial perspective view of composite door panels according to the invention.
FIG. 32 is a partial section view of an additional embodiment of composite door panels according to the invention.

It will also be appreciated that the use of various panel configurations and construction, such as the panels illustrated in FIGS. 9A, 31 and 32, will provide further means of tayloring the shear load resistance and damping of the system and, hence, adjoining structure.

Figure 21A:
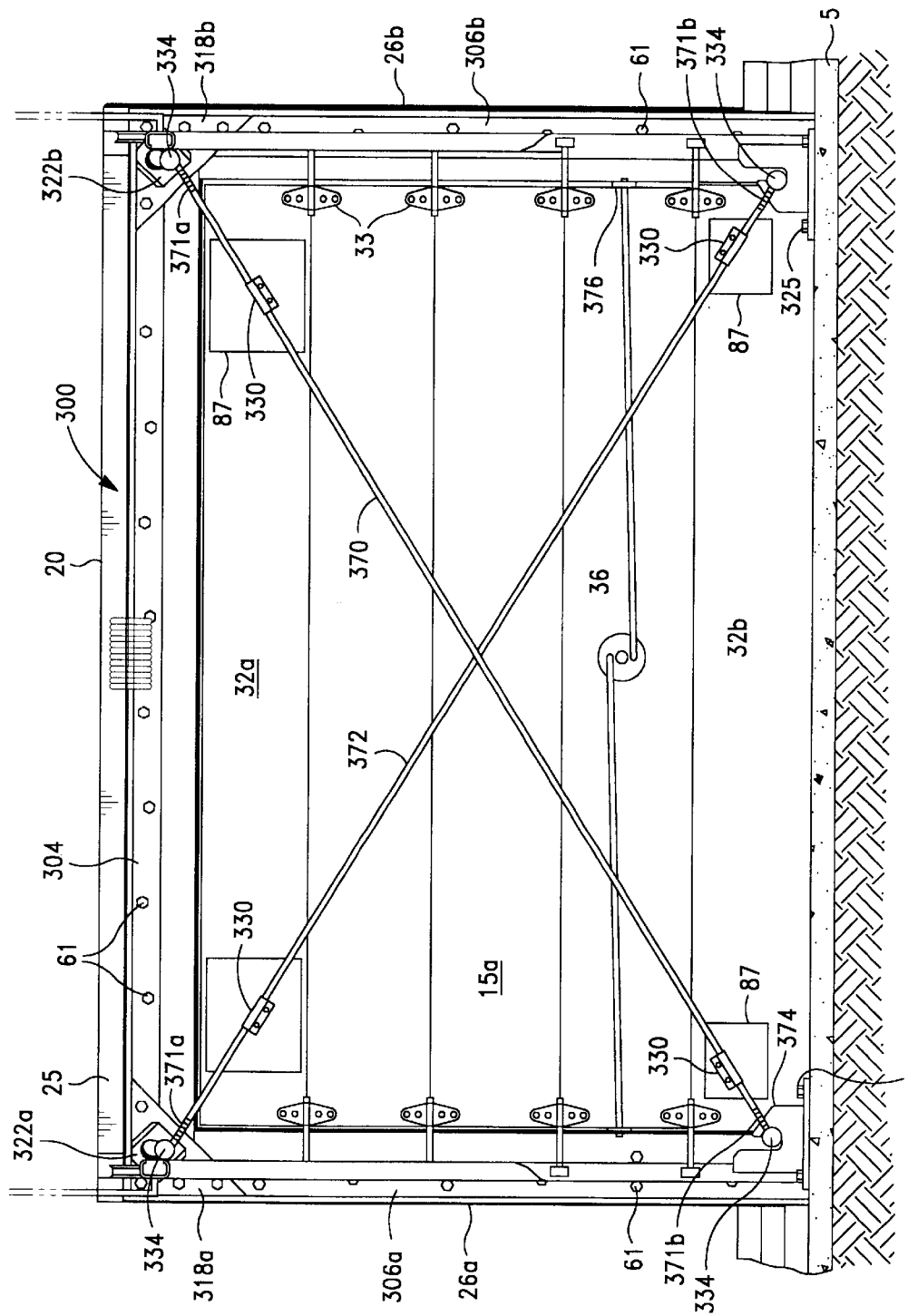
FIG. 21A is a front elevational view of an additional embodiment of the structural reinforcement system of the invention.

Referring now to FIG. 21A, there is shown an additional embodiment of the invention wherein the reinforcing frame structure 300 illustrated in FIG. 12 is employed. However, as illustrated in FIG. 13, each corner anchor 318a, 318b includes a pin engagement portion or section 322a, 322b, discussed in detail below.

Figure 21B:
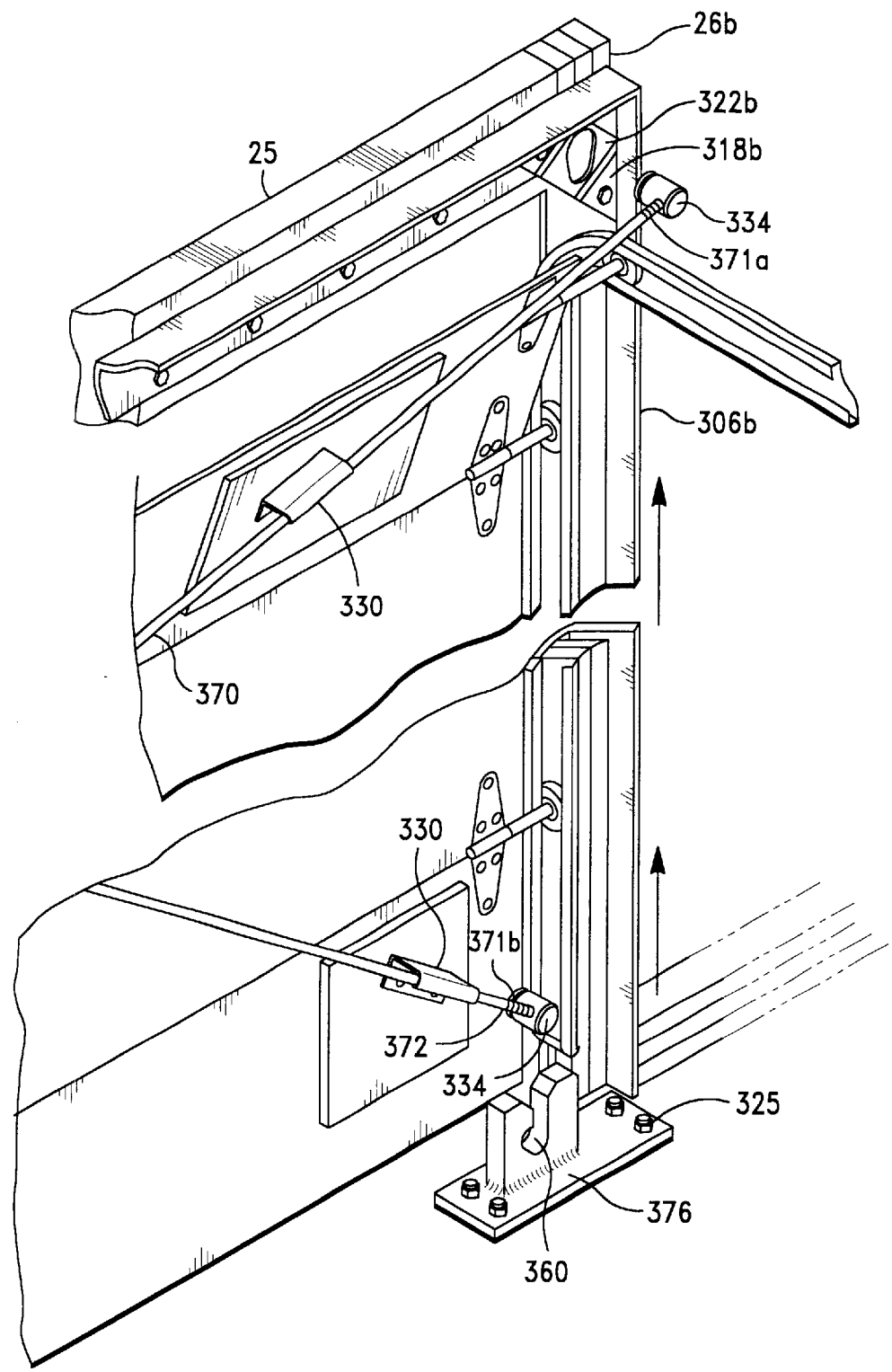
FIG. 21B is a partial perspective view of the embodiment of the invention shown in FIG. 21A, illustrating the release of the structural reinforcement system according to the invention.

As illustrated in FIGS. 21A and 21B, the structural reinforcement system similarly includes adjustable load transfer members 370, 372 and load collectors 374, 376. In this embodiment, the load collectors 374, 376 are preferably anchored to the foundation 5 via bolts 325. In additional embodiments of the invention, not shown, the load collectors 374, 376 are also anchored to the vertical support sections 306a, 306b.

Figure 23:
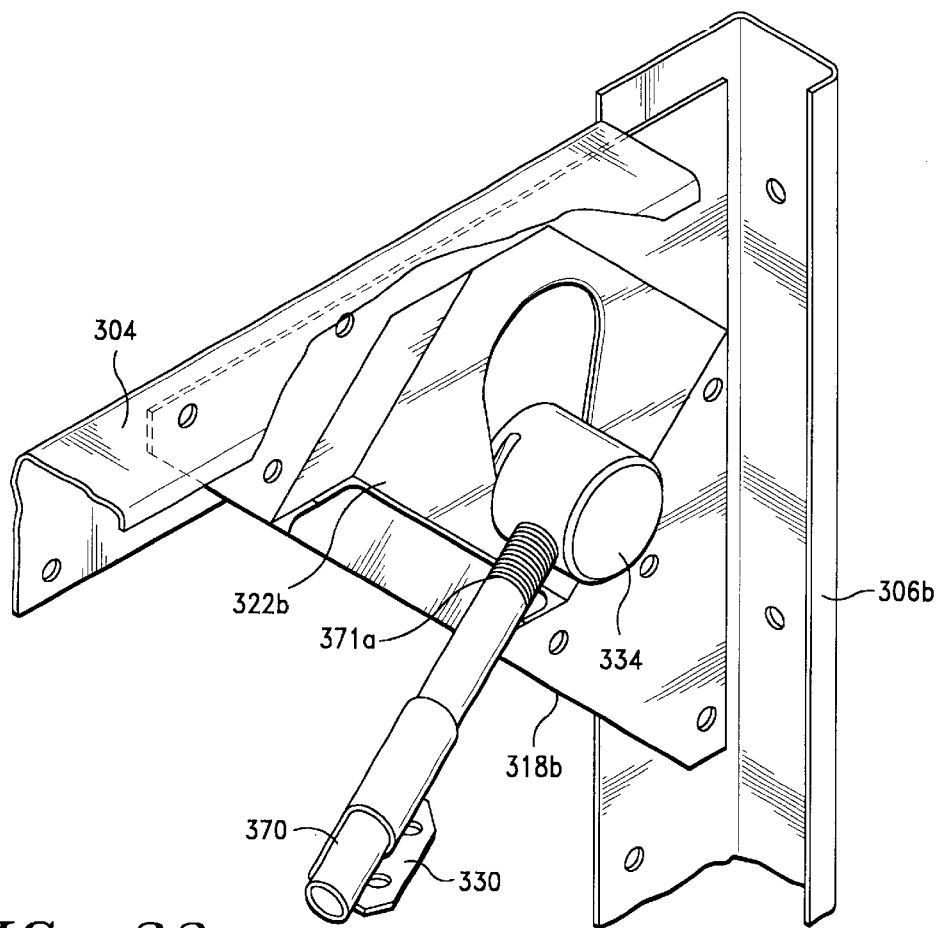
FIG. 23 is a partial perspective view of the embodiment of the invention shown in FIG. 21A, illustrating the engagement of the pin and the pin engagement section of the corner anchors according to the invention.
Figure 24:
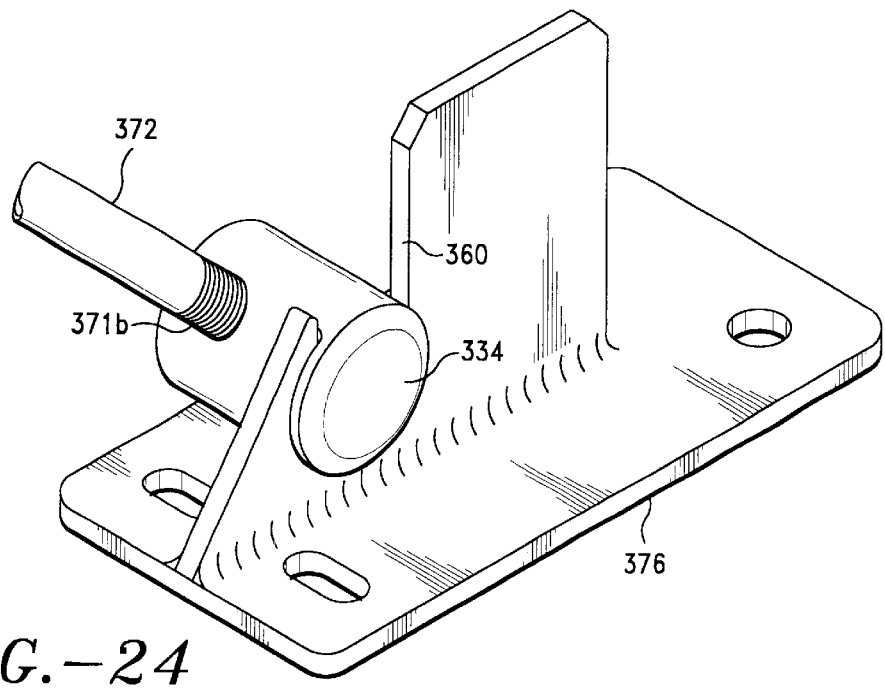
FIG. 24 is a perspective view of the load collector shown in FIG. 21A, illustrating the engagement of the pin and load collector according to the invention.

Referring now to FIGS. 23 and 24, the load transfer members 370, 372 of this embodiment preferably comprise substantially solid rods that are slideably secured to the interior side of the panels 32 via brackets 330. In a preferred embodiment, the tubular rods are constructed of steel or high strength aluminum, and include threaded ends 371a 371b adapted to adjust the length and pre-tension of the members 370, 372.

Figure 22:
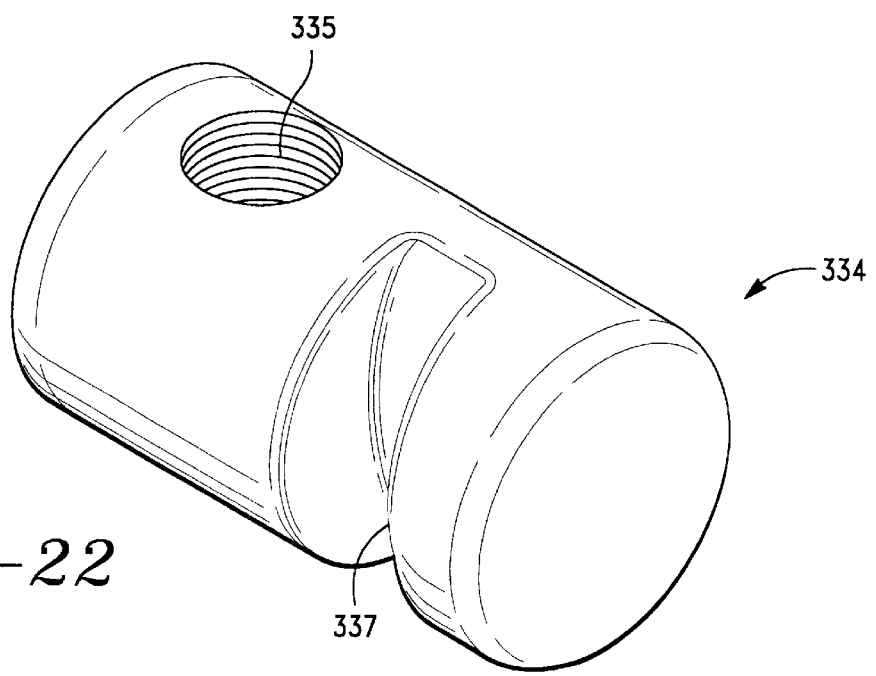
FIG. 22 is a perspective view of one embodiment of the engagement pin according to the invention.

According to the invention, the load transfer members 370, 372 include engagement pins 334 disposed on each end thereof. Referring now to FIG. 22, the engagement pins 334 are preferably substantially cylindrical in shape and include (i) a first threaded engagement portion 335 adapted to engage the threaded ends 371a, 371b of load transfer members 370, 372 and (ii) a second engagement portion 337 adapted to be received by the corner anchor pin engagement portions 322a, 322b and the pin engagement slots 360 provided in each load collector 370, 372.

Figure 25:
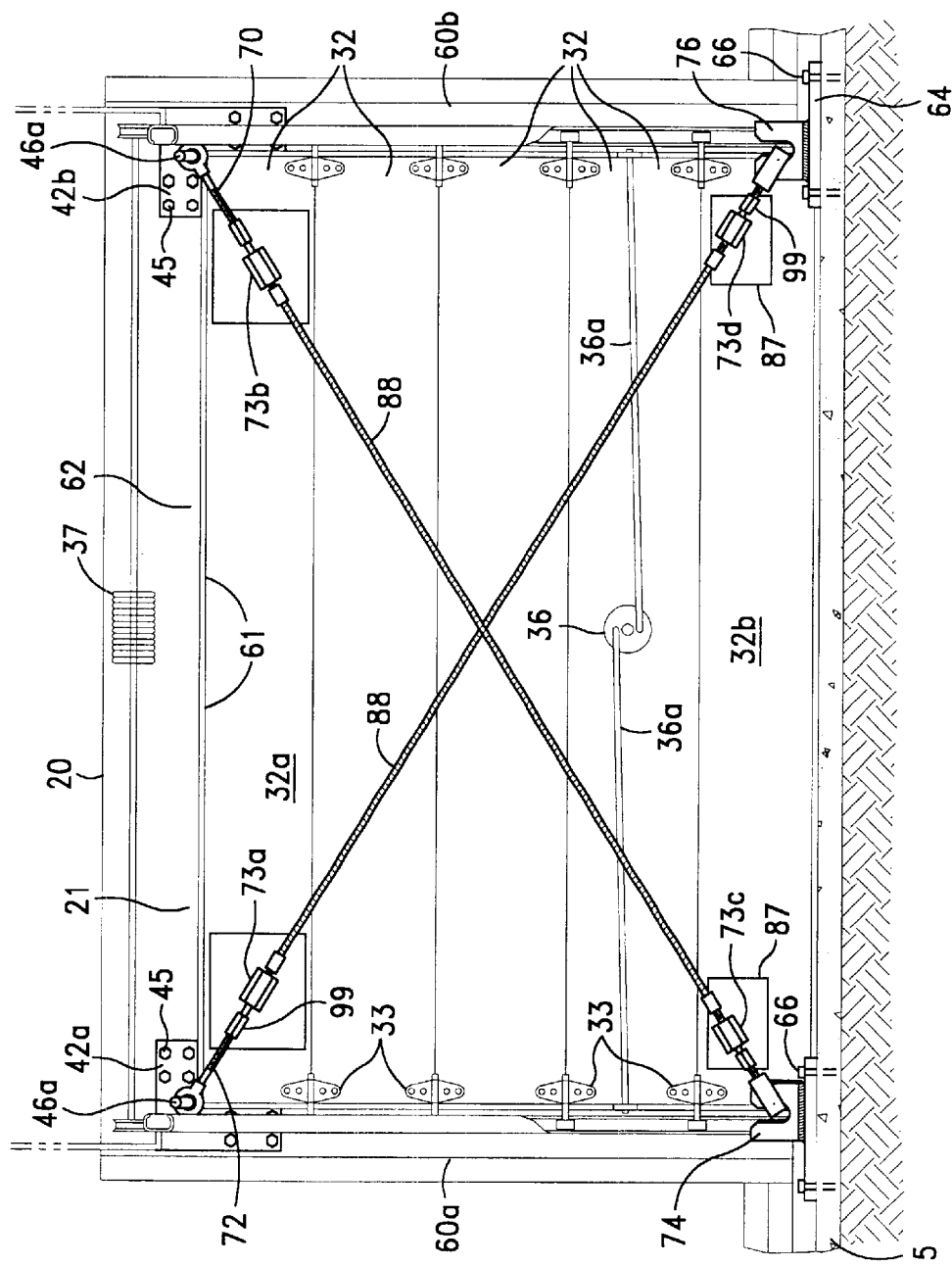
FIG. 25 is a front elevational view of yet another embodiment of the structural reinforcement system of the invention.

Referring now to FIG. 25, there is shown an additional embodiment of the invention wherein the structural reinforcement system described above is employed without the reinforcing frame structure 21. In this embodiment, the frame reinforcement members 42a, 42b are employed as described above.

The load collectors 74, 76 shown in FIG. 10A are also employed. The load collectors 74, 76 are preferably anchored directly to the foundation 5.

Although the noted embodiment does not provide all the advantages associated with the system employing the reinforced frame structure 21, such as that shown in FIG. 15, the improvements in structural integrity as compared to a conventional garage door system are notable.

Applicants have particularly found that the unique reinforcement system shown in FIG. 15, when the garage door 15a is in the closed position, significantly enhances the structural integrity and, hence, earthquake resistance of a garage structure (Y) by effectively transferring the applied loads proximate points G, H, I and J (see FIG. 2) to the supporting foundation 5 (i.e., continuous load path). As will be appreciated by one having ordinary skill in the art, the reinforcement system will also enhance the resistance to external wind loads, denoted by Arrow W (see FIG. 26B).

Figure 26A:
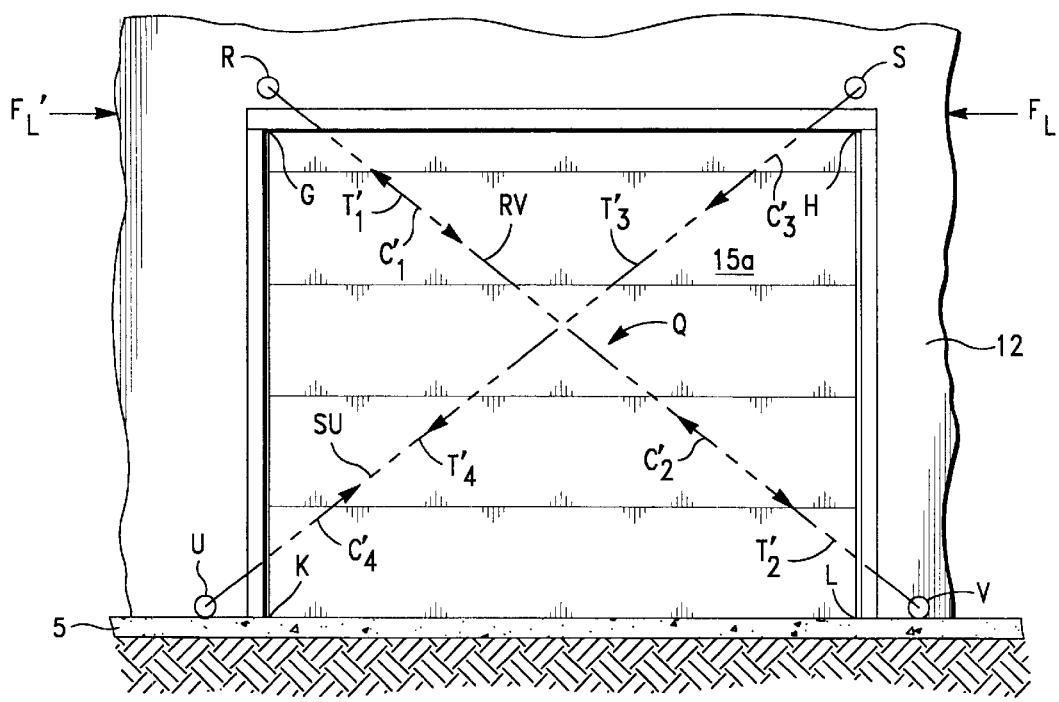
FIG. 26A is a schematic plan view of a garage structure, illustrating the load transfer links between points in the garage structure upon application of lateral forces according to the invention.
Figure 26B:
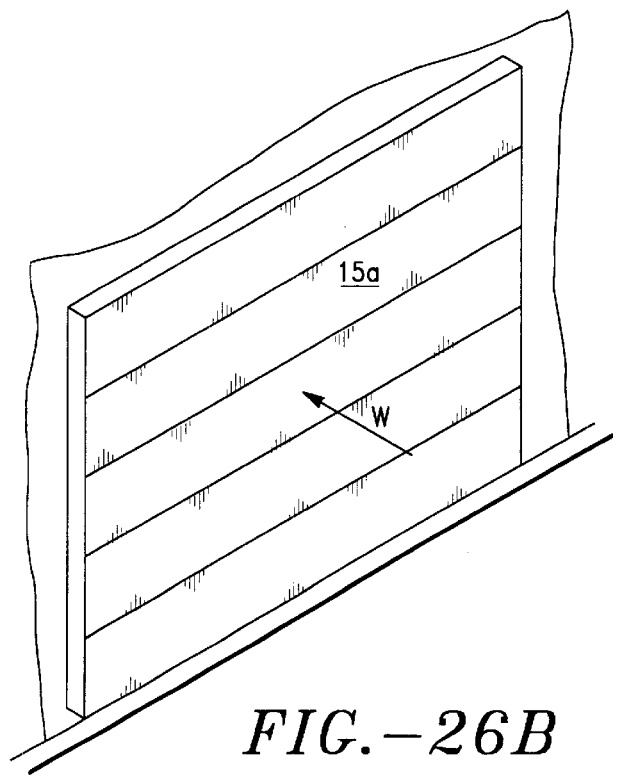
FIG. 26B is a perspective view of the garage structure shown in FIG. 25A, illustrating the application of an external wind load.

Referring now to FIG. 26A, during application of a lateral force, $F_L$, to the garage structure 12, the load transfer member shown in phantom and denoted RV would exhibit a tensile load (denoted by Arrows $T'_1, T'_2$). The load transfer member RV would also provide a substantially continuous tensile load path from point R to point V—i.e., header pin 78 to load collector 76 (see FIG. 15).

Similarly, if the lateral force denoted $F'_L$ were applied to the garage structure 12, the load transfer member shown in phantom and denoted SU would exhibit a tensile load (denoted by Arrows $T'_3, T'_4$). The load transfer member SU would also provide a substantially continuous tensile load path from point S to point V—i.e., header pin 80 to load collector 74.

The above discussed load transfer means of the invention is applicable to embodiments of the invention wherein the load transfer members substantially comprise wire rope, such as members 70, 72 shown in FIG. 15. If the load transfer members comprise substantially solid rods, such as the members 370, 372 shown in FIG. 21A, each load transfer member would provide a substantially continuous tensile and compressive load path.

Referring to FIG. 26A, according to the invention, upon application of lateral force $F_L$, load transfer member SU would exhibit a compressive load (denoted by Arrows $C'_3, C'_4$), which, depending upon the compressive strength of member, would be similarly transferred from point S to point U—i.e., corner anchor 318b to load collector 374 (see FIG. 21A). Load transfer member RV would similarly exhibit and substantially transfer a tensile load from point R to point V, as discussed above.

Upon application of the lateral force $F'_L$, load transfer member RV would exhibit a compressive load (denoted by Arrows $C'_1, C'_2$), which would similarly be transferred from point R to point V—i.e., corner anchor 318a to load collector 376. Load transfer member SU would also exhibit and substantially transfer a tensile load from point S to point U, as discussed above.

Although the unique load transfer means of the invention have been described in connection with substantially lateral loads, as will be appreciated by one having ordinary skill in the art, the load transfer means is also applicable to substantially horizontal loads and/or rotational loads, or combinations thereof.

Figure 27:
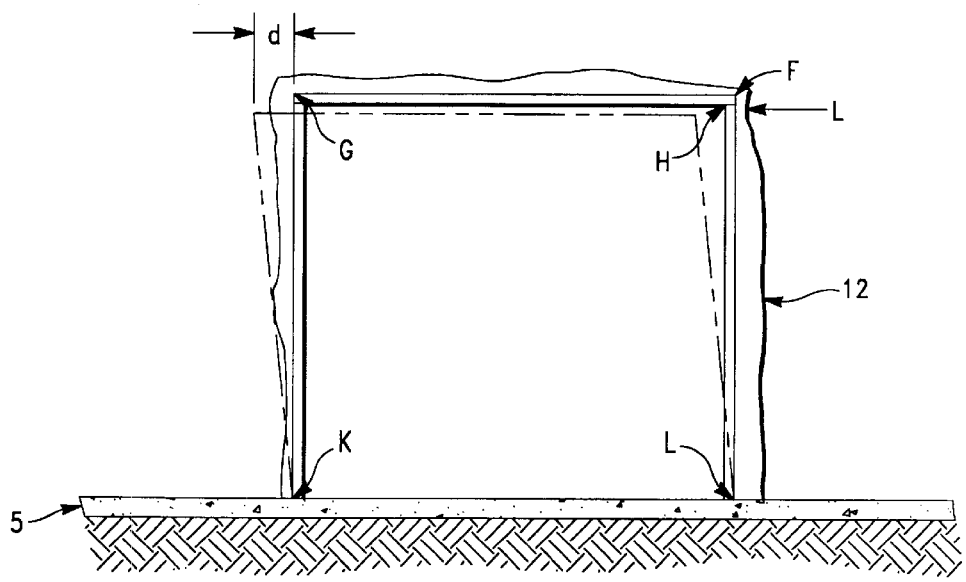
FIG. 27 is a schematic plan view of a garage structure, illustrating an applied lateral load and resultant deflection in the garage structure.
Figure 28:
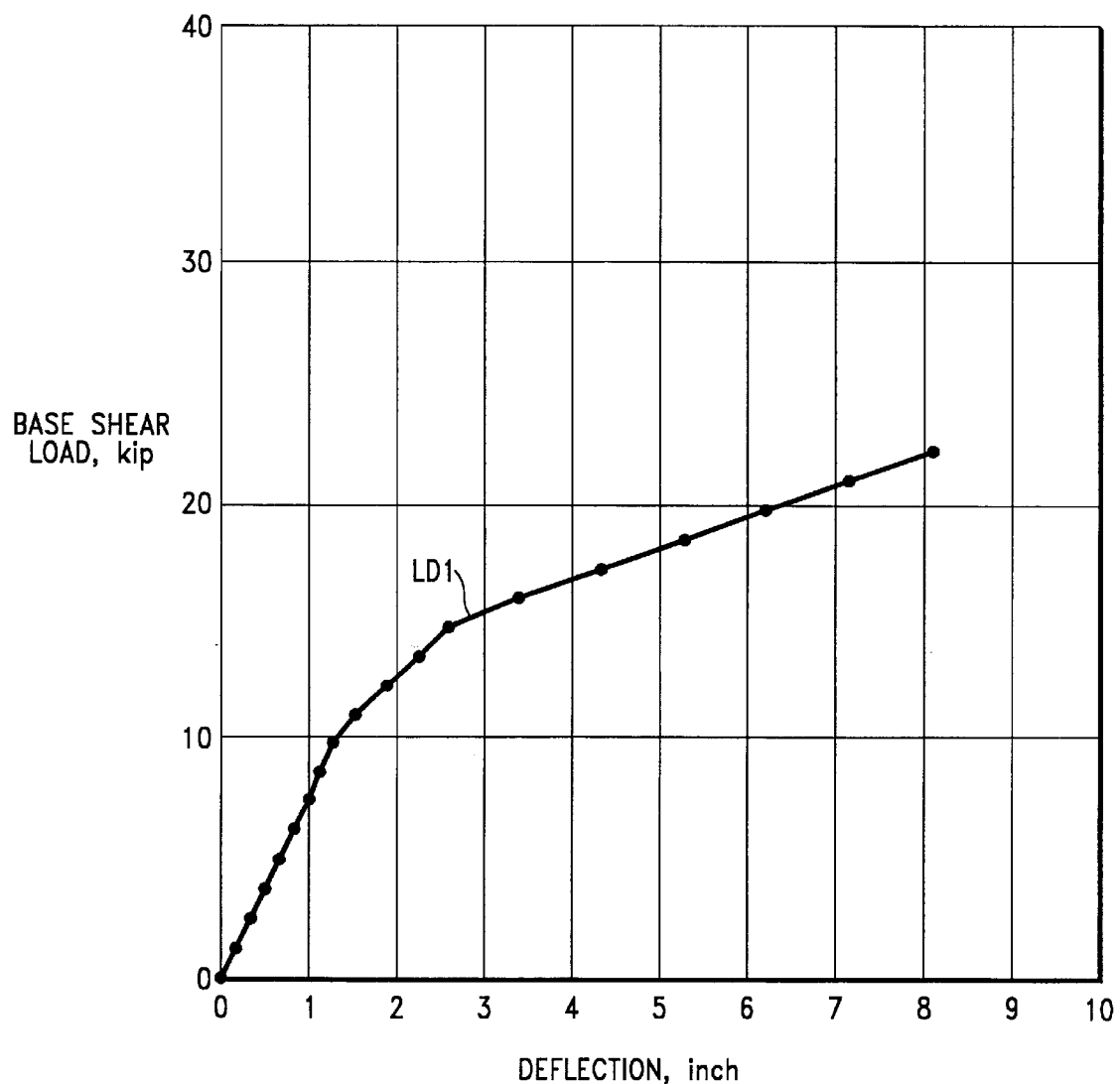
FIG. 28 is a deflection versus load curve for a garage structure having a wood frame.
Figure 29:
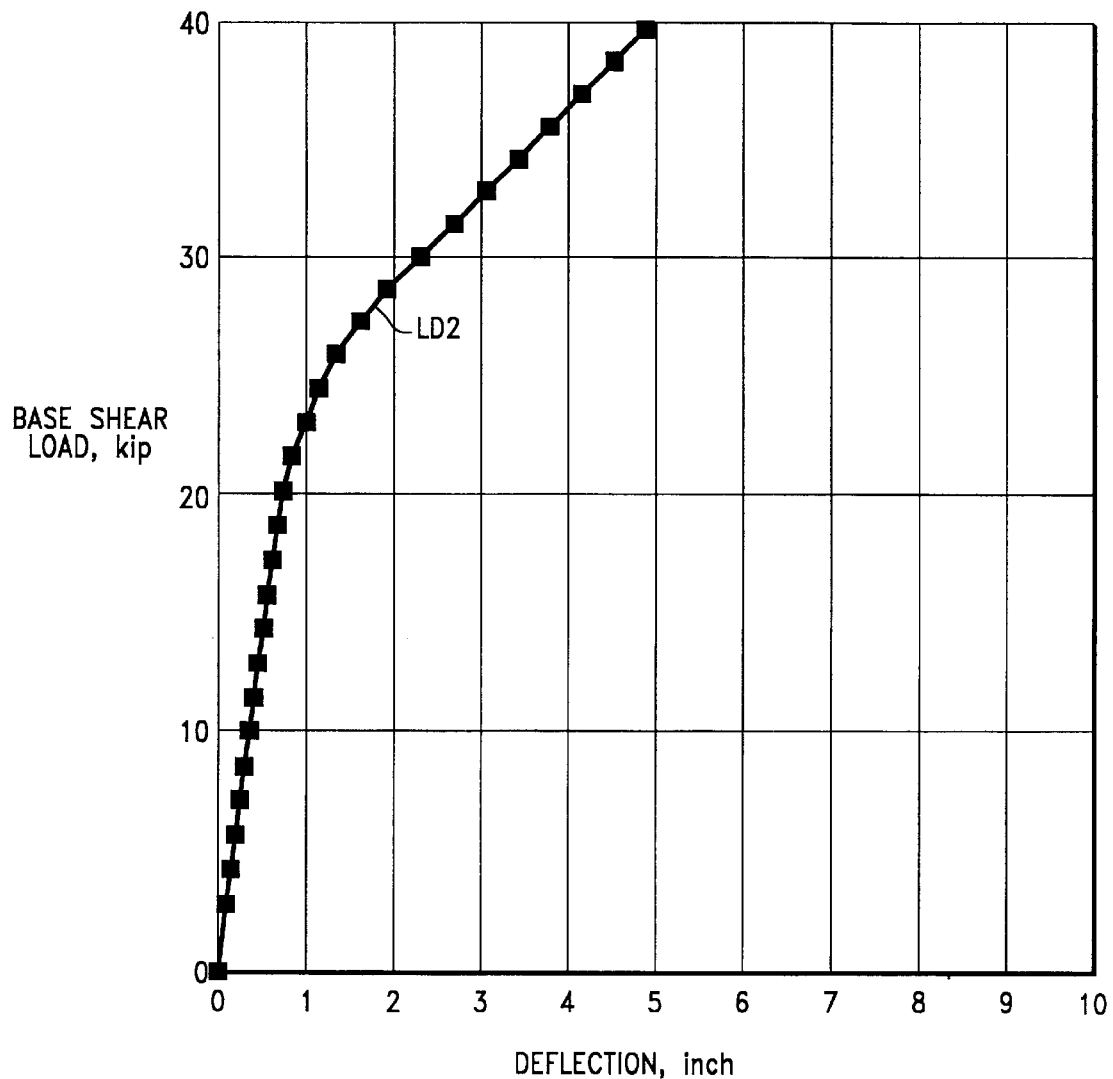
FIG. 29 is a deflection versus load curve for a garage structure incorporating the structural reinforcement system of the invention.

Referring now to FIGS. 28 and 29, there are shown applied load versus deflection curves LD1, LD2 for a garage structure, such as garage structure 12 shown in FIG. 27 (see also FIG. 2), and a garage structure employing the reinforcement system of the invention, such as that illustrated in FIG. 15A. The curves LD1, LD2 further demonstrate the structural integrity and, hence, enhanced earthquake resistance characteristics achieved by virtue of the present invention.

The curves LD1, LD2 were generated via a conventional computer finite element analysis ("FEA"), which was based on the application of a lateral load (denoted by Arrow L) to the garage structure 12 proximate point F. The resultant deflection (d) was measured proximate point G. The load transfer members employed in the analysis comprised prestressed bridge strand cable having a Modulus of Elasticity of approx. 25,000,000 PSI.

As can be seen in FIG. 28, for a base shear load of approximately 20 kips., the resultant deflection in a typical wood frame was over 6.0 in. For the same load. the resultant deflection in the garage structure 12 with the reinforcement system of present invention was less than 1.0 in. (see FIG. 29).

It will thus be appreciated by one having ordinary skill in the art that a structure (e.g., 12), such as that illustrated in FIG. 5, employing the reinforcement system of the invention will exhibit significantly enhanced relative stiffness. As discussed above, the reinforcement system is also capable of providing variable shear load resistance/stiffness to tailor the resulting seismic characteristics of the building.

It will also be appreciated that a conventional garage door or panel, by virtue of the present invention, will substantially provide all of the advantageous characteristics associated with a shear structure or panel (e.g., plywood wall). Indeed, according to the invention, the garage door would exhibit a shear load resistance comparable to, and in several embodiments discussed below, greater than a conventional "bearing wall system."

Figure 30:
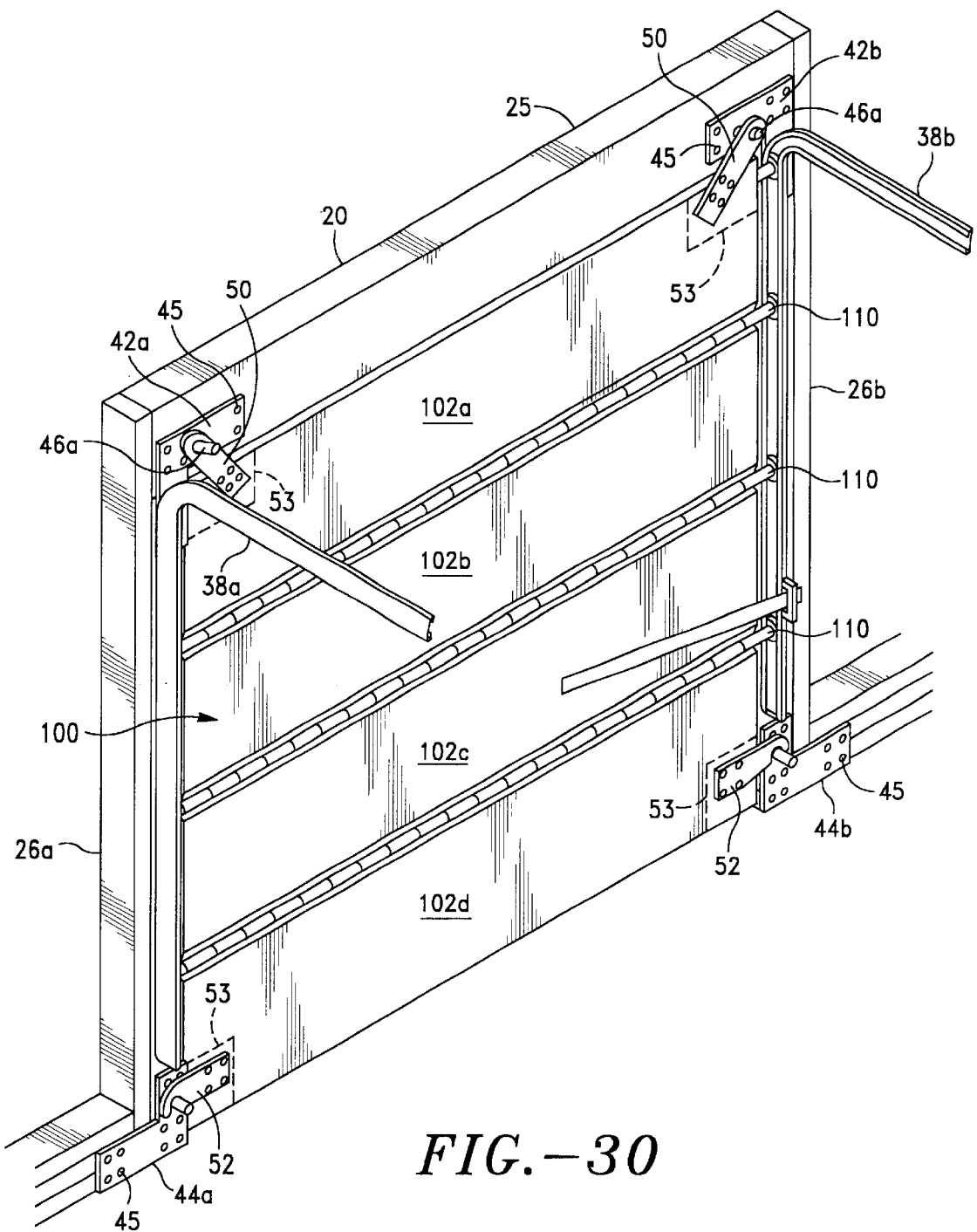
FIG. 30 is a perspective view of an additional embodiment of the structural reinforcement system of the invention.

Referring now to FIGS. 30–32, there is shown yet another embodiment of the invention. As illustrated in FIG. 30, in this embodiment the same upper and lower shear members 50, and upper and lower frame reinforcement members 42a, 42b, 44a, 44b are employed.

However, in the noted embodiment, the garage door comprises a reinforced shear panel 100. According to the invention, the shear panel 100 includes a plurality of hingedly connected "composite" panels 102a–102d and a plurality of substantially elongated hinge assemblies 110, adapted to connect the panels 102a–102d.

As will be appreciated by one having skill in the art, the panels 102a–102d may comprise various materials. In a preferred embodiment, each panel 102a–102d comprises a substantially honeycomb structure having an outer skin 104, a first core portion proximate the hinge portion 108 and a second core portion 106 (see FIG. 31).

According to the invention, the skin 104 can comprise aluminum, steel, fiberglass or other like materials. The first core portion 106 and second core portion 108 can comprise foam, grain balsa, corrugated cardboard or other like sandwich structure core material. Preferably, the first and second core portions 106, 108 comprise foam.

In an additional envisioned embodiment of the invention, shown in FIG. 32, the shear panel 100 includes interlocking means adapted to rotatably secure the panels (e.g., 102a–102d) in a substantially coincident plane when the panel 100 is in the closed position.

Referring to FIG. 32, in a preferred embodiment the interlocking means includes a similar elongated hinge assembly 125 and an elongated hinge engagement member 124 (disposed on a first panel 120a) adapted to substantially engage the engagement chamber 126 on the adjoining (or adjacent) panel 120b.

According to the invention, the panels 120a, 120b similarly comprise a honeycomb or like structure, having an outer skin portion 128 and a core 129. In a preferred embodiment the outer skin 128 comprises fiberglass and the core portion 129 comprises urethane foam.

As will be appreciated by one having ordinary skill in the art, the shear composite panels shown in FIGS. 31 and 32 may also be employed in the embodiments of the invention shown in FIGS. 15, 21A, 25 and 33 to enhance the structural integrity of the noted system(s).

Referring now to FIGS. 33–39, there is shown yet another embodiment of the present invention. As will be appreciated by one having ordinary skill in the art, this embodiment further enhances the structural integrity of the reinforcement system of the invention.

Figure 33:
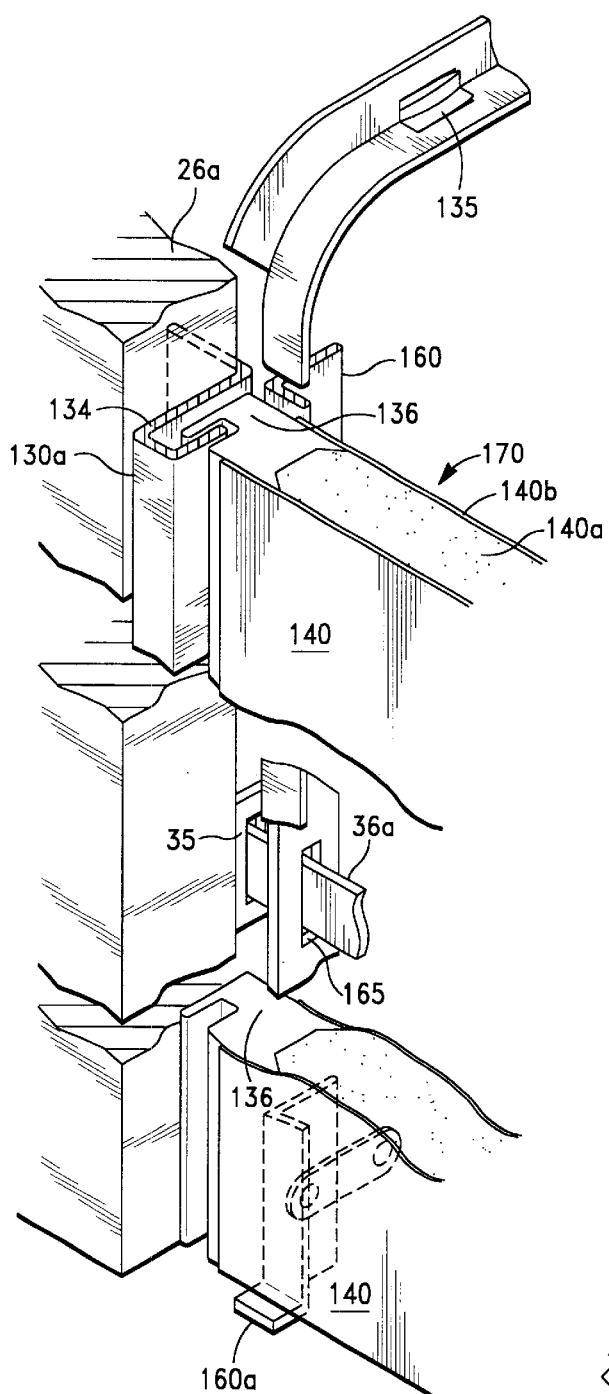
FIG. 33 is a partial perspective view of a further embodiment of the structural reinforcement system of the invention.
Figure 36:
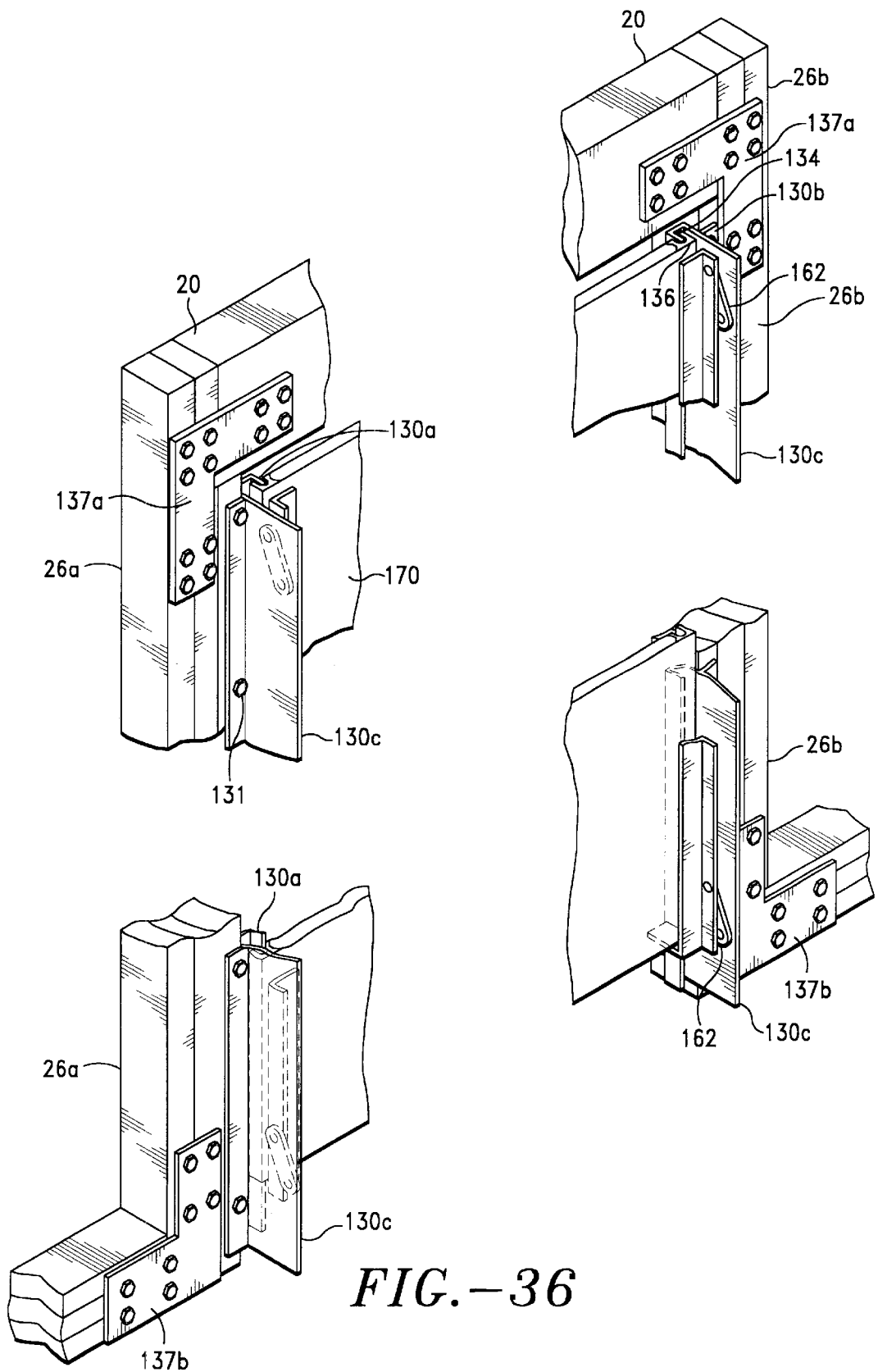
FIGS. 36 and 37 are partial perspective views of the embodiment of the invention shown in FIG. 33.

Referring to FIGS. 33 and 36, in the noted embodiment, a pair of tracks 130a, 130b are provided. According to the invention, the tracks 130a, 130b are attached to the vertical support members 26a, 26b via bolts 131. The tracks 130a, 130b may also be employed in conjunction with the reinforcing frame structures 21, 300, 400 shown in FIG. 10A, 12 and 14.

Figure 37:
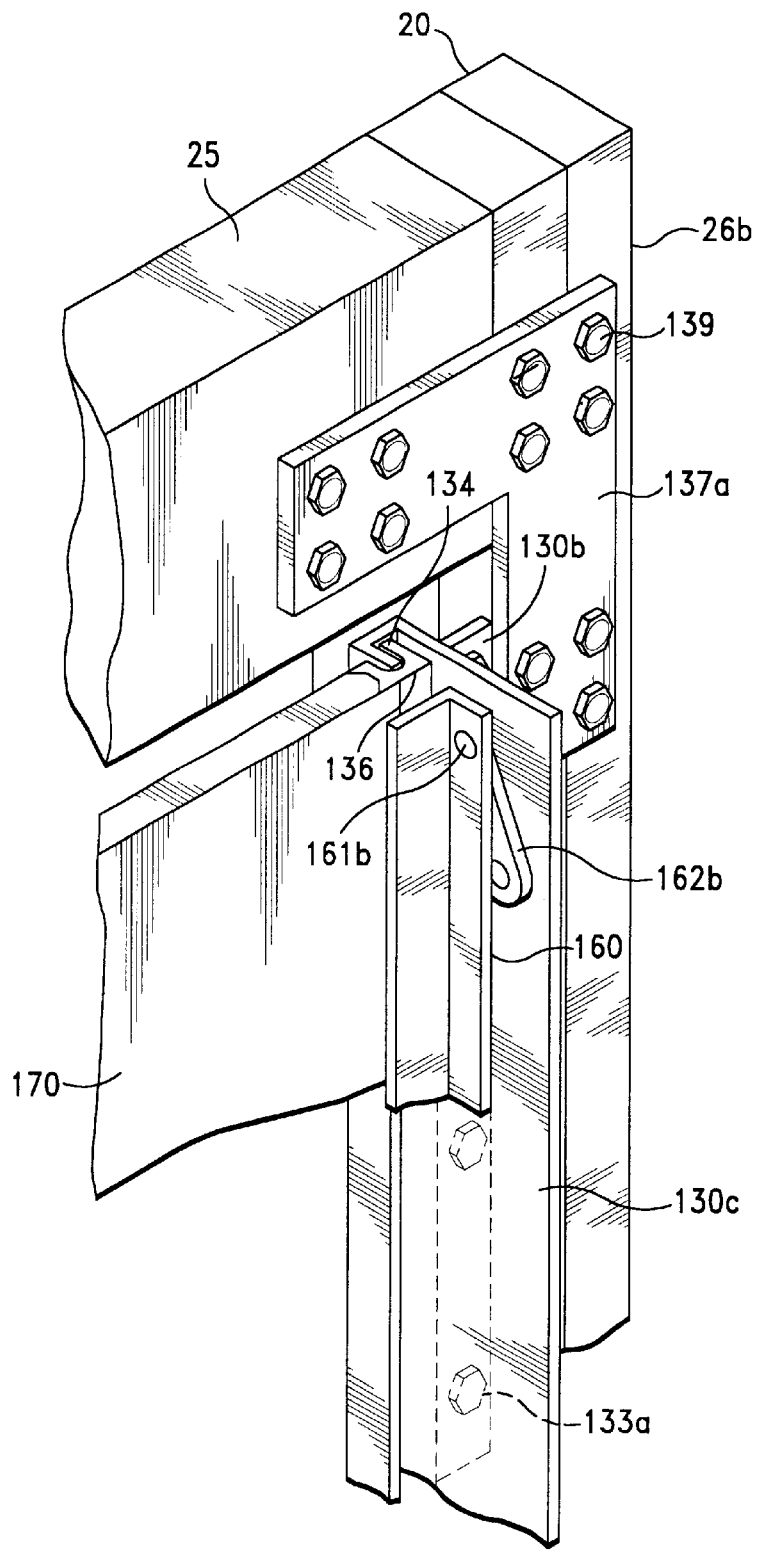

As illustrated in FIGS. 36 and 37, upper frame reinforcements 137a and lower frame reinforcements 137b are also provided. The upper frame reinforcements are preferably attached to the frame structure 20 proximate the adjoining ends of the vertical supports 26a, 26b and header 25 (see FIG. 37). The lower frame reinforcements 137b are preferably attached to the frame structure 20 proximate the lower ends of the vertical supports 26a, 26b.

According to the invention, the frame reinforcements 137a, 137b can be attached to the frame structure 20 by conventional means. In a preferred embodiment, the frame reinforcements 137a, 137b are attached to the frame structure 20 via a plurality of bolts 139.

Figure 35:
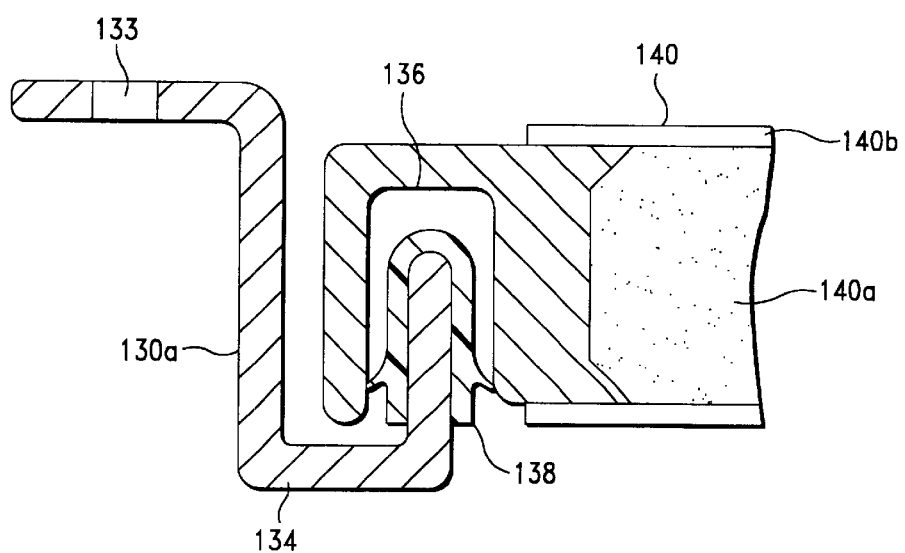
FIG. 35 is a partial section view of a track and door panel, illustrating the slidable engagement of the tracks and panels according to the invention.

As illustrated in FIG. 35, the tracks 130a, 130b include a substantially U-shaped portion 134 adapted to slideably engage the correspondingly shaped panel engagement portion or section 136 disposed one each end of the panels 140. The tracks 130a, 130b further include mounting holes 133 adapted to receive bolts 133a and a "panel guide" 138.

According to the invention, the panels 140 similarly comprise a composite structure having a core 140a and an outer skin 140b, with the panel engagement portions 136 attached to each end thereof by conventional means. In additional envisioned embodiments, not shown, the panels 140 comprise substantially solid members (e.g., wood).

Referring to FIG. 35, the panel guide 138 preferably comprises extruded ultra high molecular weight (UHMW) polyethylene or like material, and is secured in each panel engagement portion 136 by mechanical means or conventional bonding.

As will be appreciated by one having ordinary skill the art, the panel guide 138 serves two distinct functions: (1) a bearing to enhance the movement of the panels 140 through the tracks 130a, 130b; and (2) a sealing strip.

Figure 34:
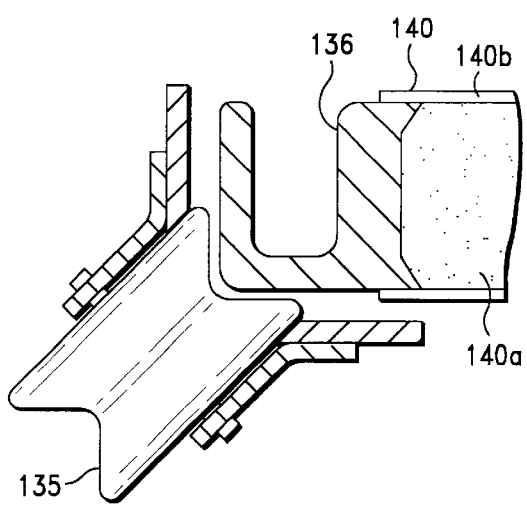
FIG. 34 is a partial section view of the embodiment of the invention shown in FIG. 33, illustrating the engagement of the track wheel assemblies and door panel engagement sections according to the invention.

Referring to FIG. 34, the upper portion of each track 130a, 130b is also provided with a plurality of guide wheel assemblies 135. The guide wheel assemblies 135 are designed and positioned on the tracks 130a, 130b to facilitate motion of the panels 140 when the panels 140 are moved through the upper portions of the tracks 130a, 130b.

As will be appreciated by one having ordinary skill in the art, the tracks 130a, 130b can also be employed with a conventional garage door or panel, such as that illustrated in FIG. 8A, or the reinforced shear panels and hinge assemblies illustrated in FIGS. 31 and 32. The tracks can also be employed in conjunction with the embodiments of the invention shown in FIGS. 8A and 25.

Referring now to FIGS. 38 and 39, there is shown an embodiment of panel securing means for the multi-panel embodiments of the invention. The panel securing means includes a locking arm 160 that is rotatively connected via pins 161 to pivot arms 162. According to the invention, the pivot arms 162 are pivotally attached via pins 163 to the track extensions 130c (see FIG. 37). In additional envisioned embodiments, the pivot arms 162 are attached to the vertical supports 26a, 26b proximate the lower end thereof.

According to the invention, the pivot arms 162 are positioning such that when the garage door (or panel) 170 is closed in the direction denoted by arrow $C_L$, the door 170 contacts the locking arm 160 at the foot portion, designated 160a (see FIG. 38) which causes the pivot arm 160 to rotate in the direction denoted by arrow $R_p$. As the pivot arm 162 rotates, the locking arm 162 exerts a force in the direction denoted by $F_D$ against the door 170.

As will be appreciated by one having skill in the art, the noted panel securing means can comprise a single pivot arm system or a dual pivot arm system disposed on both of the tracks 130a, 130b, as shown in FIG. 36, or on opposing vertical supports 26a, 26b. The panel securing means can also include a lock plate and conventional lock assembly (not shown) and, hence, be employed as the primary means of securing (i.e., locking) the garage door 170.

As illustrated in FIG. 33, the panel securing means can also be employed with a conventional locking system 36, such as that shown in FIG. 6A. In this embodiment, the locking arm 160 includes a securing hole or slot 165 designed, positioned and adapted to also receive the arm 36a of the conventional locking system 36 (in conjunction with arm engagement members 35) when the door 170 is in the closed positioned.

Figure 40:
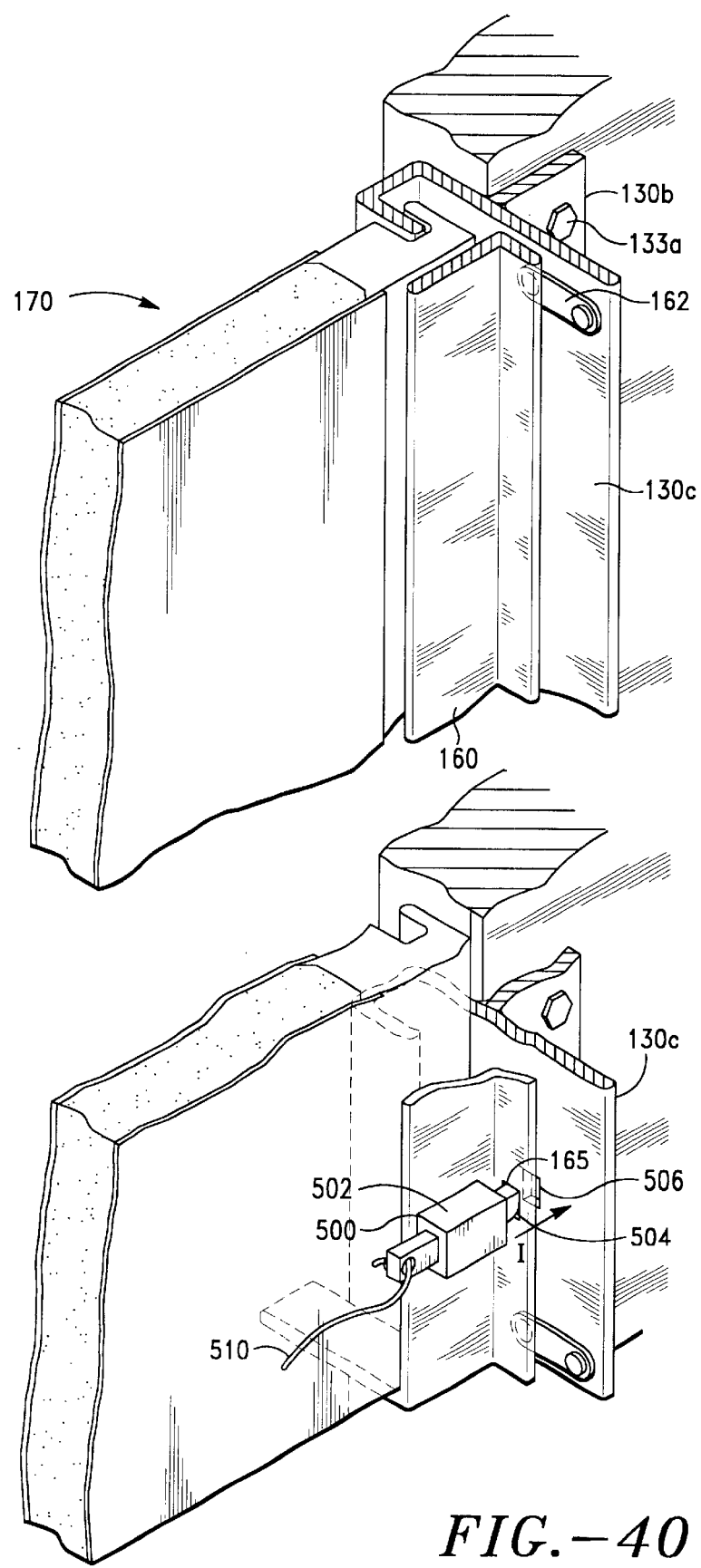
FIG. 40 is a partial perspective view of an additional embodiment of the panel securing means according to the invention.

In yet another embodiment of the invention, the panel securing means can comprise semimanual or electronically controlled means. Referring to FIG. 40, by way of illustration, there is shown a conventional latch system 500. The latch system 500 includes a housing 502 and a latch pin 504, which is adapted to slideably engage the track lock port 506 and locking arm slot 165.

According to the invention, the latch pin 504 can be spring biased in an outward direction, denoted by Arrow I, and include conventional manual release means (e.g., release cord 510) to disengage the pin 504 from the track lock port 506 and locking arm slot 165. The latch system 500 can also include conventional electronic actuation means (e.g., solenoid) to move the pin 504 in outward and inward directions for engagement and disengagement.

As will be appreciated by one having ordinary skill in the art, the panel securing means illustrated in FIG. 40 serves three distinct functions: (1) secures the locking bar 160 in the engaged position, (2) secures the door 170 in the closed position and (3) secures the engagement of the various load and shear members to their respective mating components (e.g., engagement pins 334 to load collectors 374, 376 and anchors 318a, 318b).

As will be appreciated by one having ordinary skill in the art, the reinforcement system illustrated in FIG. 33 would similarly provide shear load resistance comparable to a conventional "bearing wall system". If the reinforcement system illustrated in FIG. 33 was employed in conjunction with a reinforcing frame structure, such as reinforcing frame structure 21 illustrated in FIG. 10A or reinforcing frame structure 300 illustrated in FIG. 12, the resultant reinforcement system would provide shear load resistance greater than a conventional "bearing wall system."

To further enhance the applied force response performance of the structural reinforcement system embodiments discussed above, automatic garage door closing means can be incorporated into each noted system. In a preferred embodiment, the automatic closing means comprises motion sensing means 210, such as an accelerometer or motion detector, which is operatively connected to a conventional electrically operated garage door opener system 212. (See FIG. 41).

According to the invention, when the motion sensing means 210 receives an input reflecting a predetermined, threshold value, the sensing means provides a first signal to the electric garage door system 212. In response to the first signal, the garage door system 212 initiates the closure sequence to close the door 100 in the direction denoted by Arrows C. In the event of a power failure, the automatic closing system is additionally provided with a back-up power source, such as a battery pack (not shown).

In an additional envisioned embodiment of the invention, the automatic closing means further includes timing means and associated programming means to insure that the door (or shear panel 100) is not left open for an extended period of time. According to the invention, the timing means would sound an alarm or automatically close the door 100 if left open for more than a fixed period of time.

Without departing from the spirit and scope of this invention, one of ordinary skill can make various changes and modifications to the invention to adapt it to various usage's and conditions. As such, these changes and modifications are properly, equitably, and intended to be, within the fill range of equivalence of the following claims.

What is claimed is:

1. A structural reinforcement system for an opening in a building, said building being supported by a foundation, said opening being defined by a frame, the structural reinforcement system comprising:

a track means, said track means including a first track and a second track rigidly engaged to said frame, said first track having a substantially vertical section, said second track having a substantially vertical section;

a movable panel adapted to move in a first direction to substantially close said opening and to move in a second direction to substantially open said opening, said movable panel comprising a plurality of substantially elongated hingedly connected panel members, each of said panel members including track engagement members disposed on opposing ends, said track engagement members being adapted to be received within said first and second tracks; and a restraining means for substantially restraining said movable panel with respect to the track means, the restraining means having a shear force transmitting position and a non-shear force transmitting position, the movable panel, the track means, and the restraining means configured to provide substantial in-plane lateral and vertical shear load resistance when a force is applied to the frame with the restraining means in the shear force transmitting position.

2. The structural reinforcement system of claim 1, wherein said structural reinforcement system further includes an automatic closing means to move said movable panel from said non-shear force transmitting position to said shear force transmitting position.

3. The structural reinforcement system of claim 2, wherein said automatic closing means includes a timer adapted to move said movable panel from said non-shear force transmitting position to said shear force transmitting position when said movable panel is in said non-shear force transmitting position for a predetermined period of time.

4. The structural reinforcement system of claim 1, wherein said panel members include interlocking means for releasably securing said panel members in a substantially coincident plane when said movable panel is in said shear force transmitting position.

5. The structural reinforcement system of claim 1, wherein said structural reinforcement system provides shear load resistance in the range of approximately 2 to 35% of the inherent shear load resistance of said building.

6. A structural reinforcement system for a building, said building being supported by a foundation, said building including an opening being defined by a frame, the structural reinforcement system comprising:

a track means, said track means including a first track and a second track rigidly engaged to said frame said first track having a substantially vertical section, said second track having a substantially vertical section; and a moveable panel adapted to substantially close said opening when said panel is in a first position and substantially open said opening when said panel is in a second position, said panel comprising a plurality of substantially elongated hingedly connected panel members, each of said panel members including track engagement members disposed on opposing ends, said track members being adapted to slidably engage said first and second tracks, said movable panel and said frame configured to provide a substantially continuous load path when said panel is in said first position wherein said panel enhances the shear load resistance of said building in the range of approximately 2 to 35% when a force is applied to said building.

7. A method of structurally reinforcing an opening in a building said building being supported by a foundation, said opening being defined by a frame, said method comprising the steps of:

rigidly engaging a first track member to said frame, said first track member having a substantially vertical section;

rigidly engaging a second track member to said frame, said second track member having a substantially vertical section, said first and second track members being in communication with each other;

connecting a movable panel to said first and second track members, said movable panel being adapted to move in a first direction to substantially close said opening when said movable panel is in a first position and to move in a second direction to substantially open said opening when said movable panel is in a second position, said movable panel comprising a plurality of substantially elongated hingedly connected panel members, each of said panel members further including a track engagement member disposed on opposing ends adapted to slidably engage said first and second track members; and substantially restraining said moveable panel from moving in said first and second directions when said movable panel is in said first position, said movable panel and said first and second track members forming a shear panel, the shear panel providing substantial in-plane lateral and vertical shear load resistance when said frame is subjected to shear loading.

8. A structural reinforcement system for an opening in a building, said building being supported by a foundation, said opening being defined by a frame, the structural reinforcement system comprising:

a track means, said track means including a first track and a second track rigidly engaged to said frame, said first track having a substantially vertical section, said second track having a substantially vertical section;

a reinforcing structure adapted to be received by said opening, said reinforcing structure coupled to said track means;

a movable panel adapted to move in a shear force transmitting direction to substantially close said opening and to move in a non-shear force transmitting direction to substantially open said opening, said movable panel comprising a plurality of substantially elongated hingedly connected panel members, each of said panel members including track engagement members disposed on opposing ends, said track engagement members being adapted to be received within said first and second tracks; and a restraining means in communication with said frame for substantially restraining said panel from moving when said panel is in said shear force transmitting position, said panel, said frame, and said reinforcing structure forming a shear panel, said shear panel providing substantial in-plane lateral and vertical shear load resistance when said frame is subjected to shear loading.

9. The structural reinforcement system according to claim 8, wherein the reinforcing structure comprises a first support, a second support and a top support, wherein said top support is coupled to said first and second support.

10. The structural reinforcement system according to claim 9, wherein said first, second and top support are disposed within said opening.

11. The structural reinforcement system according to claim 9, wherein said first, second and top support are disposed upon said opening.

12. The structural reinforcement system according to claim 9, wherein said reinforcing structure is coupled to said first and said second track members.

* * * * *

UNITED STATES PATENT AND TRADEMARK OFFICE
CERTIFICATE OF CORRECTION

PATENT NO. : 6,374,551 B1
DATED : April 23, 2002
INVENTOR(S) : John Hulls

It is certified that error appears in the above-identified patent and that said Letters Patent is hereby corrected as shown below:

<u>Title page,</u>
Item [75], Inventors, delete "Kenneth T. Boilen, Greenbrae; Arthur B. Richardson, Mill Valley; John Hulls, Point Reyes; Jean-Jacques Landry, San Francisco; Ralph C. Francis, Oakland, all of CA (US)", insert -- John Hulls, Point Reyes, CA (US) --.

Signed and Sealed this

Thirty-first Day of December, 2002

JAMES E. ROGAN
*Director of the United States Patent and Trademark Office*